United States Patent
Alameh et al.

(10) Patent No.: US 10,713,002 B1
(45) Date of Patent: Jul. 14, 2020

(54) ELECTRONIC DEVICES AND CORRESPONDING METHODS FOR ADJUSTING AUDIO OUTPUT DEVICES TO MIMIC RECEIVED AUDIO INPUT

(71) Applicant: Motorola Mobility LLC, Chicago, IL (US)

(72) Inventors: Rachid Alameh, Crystal Lake, IL (US); Thomas Gitzinger, Libertyville, IL (US); Eric Krenz, Crystal Lake, IL (US); John Gorsica, Round Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/450,823

(22) Filed: Jun. 24, 2019

(51) Int. Cl.
| | |
|---|---|
| *G10L 17/00* | (2013.01) |
| *G06F 3/16* | (2006.01) |
| *H04R 29/00* | (2006.01) |
| *H04R 3/00* | (2006.01) |
| *G06K 9/00* | (2006.01) |

(52) U.S. Cl.
CPC ......... *G06F 3/165* (2013.01); *G06K 9/00362* (2013.01); *G10L 17/005* (2013.01); *H04R 3/00* (2013.01); *H04R 29/001* (2013.01); *H04R 2430/01* (2013.01)

(58) Field of Classification Search
None
See application file for complete search history.

(56) References Cited

U.S. PATENT DOCUMENTS

| | | | |
|---|---|---|---|
| 9,324,322 B1* | 4/2016 | Torok | G10L 15/22 |
| 2019/0122666 A1 | 4/2019 | Raitio et al. | |
| 2019/0311718 A1* | 10/2019 | Huber | G06F 3/013 |
| 2020/0134211 A1* | 4/2020 | Miller | H04W 12/02 |

OTHER PUBLICATIONS

"Inverse Square Law for Sound", http://hyperphysics.phy-astr.gsu.edu/hbase/Acoustic/invsqs.html#c1 (online); Unknown publication date, but prior to filing of present application; Visited Jun. 13, 2019.

* cited by examiner

*Primary Examiner* — James K Mooney
(74) *Attorney, Agent, or Firm* — Philip H. Burrus, IV

(57) ABSTRACT

A method in an electronic device includes receiving, with an audio input device, an audio input from one or more sources. The method includes determining, with one or more sensors operable with one or more processors, whether the audio input was received from a single source or a plurality of sources. Where the audio input is received from the single source, the method includes adjusting, with one or more processors, an audio output sound pressure level of an audio output device to a first audio output sound pressure level. Where the audio input is received from the plurality of sources, the method include adjusting, with the one or more processors, the audio output sound pressure level of the audio output device to a second audio output sound pressure level that is less than the first audio output sound pressure level.

18 Claims, 10 Drawing Sheets

ELECTRONIC DEVICES AND CORRESPONDING METHODS FOR ADJUSTING AUDIO OUTPUT DEVICES TO MIMIC RECEIVED AUDIO INPUT

BACKGROUND

Technical Field

This disclosure relates generally to electronic devices, and more particularly to electronic devices comprising audio input and audio output devices.

Background Art

Portable electronic devices, such as smartphones, tablet computers, and wearable electronic devices, are becoming ubiquitous in modern society. Many people today own a smart phone or other wireless communication device with which they communicate with friends, workers, and family, manage calendars, purchase goods and services, listen to music, watch videos, play games, and surf the Internet.

As the technology associated with these devices has advanced, so too has their feature set. Not too long ago nearly all portable electronic devices had physical keypads. Now, physical keypads are the exception, as touch sensitive displays are preferred as user interface devices due to their configurable feature set. Many electronic devices now include "voice assistants" that allow a user to deliver commands and obtain information with audible signals as well. While such audio components function reasonably well, it would be desirable to have an improved audio user interface that functioned less like a machine and more like a human being.

Figure 1:
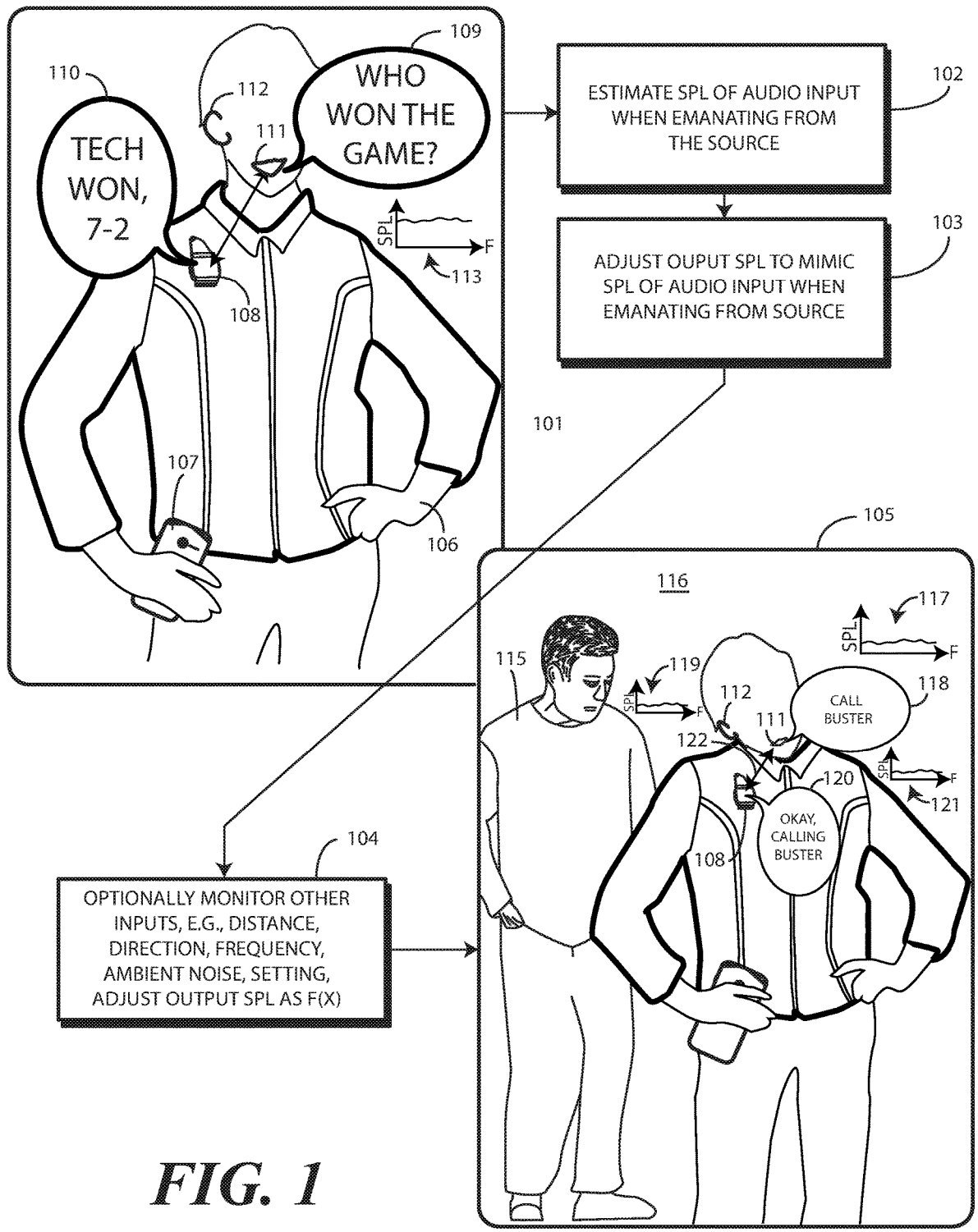
FIG. 1 illustrates one or more explanatory method steps associated with usage of an explanatory electronic device configured in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to receiving audio input with an audio input device, estimating a sound pressure level of the audio input when it was output or otherwise emanating from a source, and adjusting an audio output device to mimic the sound pressure level of the audio input when emanating from the source. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of adjusting an audio output sound pressure level of an audio output device to mimic the sound pressure level of received audio input when that audio input was emanating from a source, as described herein. The non-processor circuits may include, but are not limited to, a radio receiver, a radio transmitter, signal drivers, clock circuits, power source circuits, and user input devices.

As such, these functions may be interpreted as steps of a method to perform an operation of estimating an emanating audio input sound pressure level of a received audio input when the audio input emanated from a source, and adjusting an audio output sound pressure level of an audio output device to mimic the emanating audio input sound pressure level. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within 10 percent, in another embodiment within 5 percent, in another embodiment within 1 percent and in another embodiment within 0.5 percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device, which can be wearable in one or more embodiments, that is designed to mimic a user who is delivering audio input to the electronic device. Advantageously, embodiments of the disclosure enhance privacy when a user engages the electronic device in a hands-free audio mode of operation by, in one or more embodiments, estimating an emanating audio input sound pressure level of received audio input when that audio input emanated from the source, and adjusting an audio output sound pressure level of an audio output device of the electronic device to mimic the emanating audio input sound pressure level. Moreover, embodiments of the disclosure allow the audio interface of the electronic device to act as a person conversing with the user, thereby speaking at generally the same audio level as the user.

Embodiments of the disclosure contemplate that two side-by-side people engaged in a conversation tend to speak at relatively common sound pressure levels. If one person is speaking in a conversational tone and volume, for example, the other rarely shouts or whispers. They instead speak in relatively the same tone and volume. However, if a stranger were to approach, and the two conversing people did not want the stranger to overhear their discussion, one person might lower their vocal sound pressure level. When this occurs, embodiments of the disclosure contemplate that the second person might do the same in emulation of the first speaker.

In addition to adjusting vocal sound pressure level, embodiments of the disclosure also contemplate that when a first person desires to discuss a private topic with a second person, the first person may move closer to the second so that the reduced vocal sound pressure level will be audible. In this manner, the first person can speak with a lower vocal sound pressure level at a closer distance, with the second person audibly hearing the conversation, but with the conversation being somewhat protected from eavesdroppers.

Advantageously, embodiments of the disclosure provide electronic devices and corresponding methods that mimic, with an audio output device of the electronic device, this natural engagement of two humans engaged in conversation. In one or more embodiments, an audio input device first receives audio input from a source. For instance, a user may deliver an audio command to the audio input of the electronic device, such as "How tall is the Sears Tower?"

In one or more embodiments, one or more processors operable with the audio input device then estimate a sound pressure level of the audio input when that received audio input emanated from the source. The one or more processors can then adjust, in one or more embodiments, an audio output sound pressure level of an audio output device to mimic the sound pressure level of the audio input when emanating from the source. The audio output device can then output or otherwise deliver audio output at the audio output sound pressure level in response to receiving the audio input from the source. In so doing, the electronic device not only mimics the interactions of a human being in response to the audio input, but also reacts in a more human-like manner.

In one or more embodiments, the electronic device is configured as a wearable electronic device. In other embodiments, the electronic device is configured as a non-wearable device, e.g., as a smartphone or tablet computer. When configured as a wearable electronic device, in one or more embodiments the wearable electronic device is worn on the upper torso. In another embodiment, the wearable electronic device can also be wrist worn, which may require the user to bring the electronic device near the face when communicating. In one or more embodiments, the wearable electronic device is worn near the user's face, but outside the user's ear.

In one or more embodiments, if the user speaks with a low vocal sound pressure level, i.e., softly, to the electronic device, the audio output of the electronic device responds at a similar sound pressure level in response to receiving the audio input at the low vocal sound pressure level from the user. In one or more embodiments, when the user lowers their voice when delivering audio input to the electronic device, be it for privacy reasons or other reasons, one or more processors operable with an audio input device receiving the audio input detect this vocal sound pressure level reduction. In one or more embodiments, the one or more processors estimate an emanating audio input sound pressure level when the audio input emanated from the source and adjust an audio output sound pressure level of the audio output device to mimic the emanating audio input sound pressure level. Accordingly, the output sound pressure from the audio output device becomes reduced to mimic the vocal change initiated by the user.

In one or more embodiments, the electronic device can determine distance between a user, the user's face, the user's mouth, the user's ear, or another feature of the user. In one or more embodiments, when one or more sensors detect the user or a predefined physical feature of the user approaching, the one or more processors can adjust an audio output sound pressure level of an audio output device as well. Thus, if the user desires more privacy while delivering audio input to, or receiving audio output from, the electronic device, such as when the user notices someone approaching (contextual setting is no longer private) or while sitting on train (contextual setting is public), and the user moves their mouth or another predefined physical feature closer to the electronic device, the one or more sensors will detect the reduced distance and lowers the audio output sound pressure level of the audio output device accordingly. Of course, as will be described in more detail below, a combination of distance and estimated sound pressure level can be used to adjust the audio output sound pressure level as well.

In one or more embodiments, an electronic device includes an audio input device receiving an audio input from a source. In one or more embodiments, the audio input is being received at a received audio input sound pressure level. In one or more embodiments, the electronic device also includes an audio output device and one or more processors operable with the audio input device and the audio output device.

In one or more embodiments, the one or more processors estimate an emanating audio input sound pressure level when the audio input emanated from the source. In one or more embodiments, the one or more processors then adjust an audio output sound pressure level of the audio output device to mimic the emanating audio input sound pressure level. In one or more embodiments, the one or more processors then cause the audio output device to deliver audio output in response to the audio input.

Thus, embodiments of the disclosure provide an electronic device and corresponding methods that are able to mimic received audio input with audio output delivered in response to the audio input. Accordingly, if a user delivers soft audible user input, the audio output device of the electronic device delivers soft audible output. By contrast, if a user delivers loud audible user input, the audio output device of the electronic device delivers loud audible output, and so forth.

Embodiments of the disclosure can also adjust the audio output sound pressure level as a function of distance. Thus, if a user moves closer to the electronic device, in one or more embodiments one or more processors of the electronic device can detect a distance between the source and the audio input device decreasing. The one or more processors can then reduce the audio output sound pressure level of the audio output device accordingly.

In one or more embodiments, the electronic device can include as an input background noise levels that are not due to the user speaking. Illustrating by example, in one or more embodiments one or more sensors of the electronic device can determine an ambient noise level in an environment of the electronic device. In one or more embodiments, the one or more processors can estimate the sound pressure level of the audio input when emanating from the source as a function of the detected ambient noise level. Thus, if the ambient noise level decreases, the one or more processors may reduce the audio sound pressure level of the audio output device proportionally.

In one or more embodiments, the electronic device employs one or more sensors to determine if the electronic device is in a public or private setting, thereby initializing an audio output sound pressure level of an audio output device at a first, initial, audio output sound pressure level. Illustrating by example, in one or more embodiments one or more processors determine, from signals from the one or more sensors, whether a single person or a plurality of persons are within an environment of the electronic device. Where only the single person is within the environment of the electronic device, in one or more embodiments the one or more processors initialize an audio output sound pressure level of an audio output device at a first audio output sound pressure level. By contrast, where a plurality of persons are within the environment of the electronic device, the one or more processors may initialize the audio output sound pressure level of the audio output device at a second audio output sound pressure level that is less than the first audio output sound pressure level.

In one or more embodiments, this initialization process can occur in tranches. For example, if the one or more sensors scan the background and detect no voices other than that of an authorized user, the one or more processors can conclude that the electronic device is in a private environment and may initialize the audio output device to a normal output volume. It should be noted that an imager, such as a red-green-blue camera, can also assist in assessing scene in addition to audio inspection. If the one or more sensors detect two or more voices, but those voices are all identifiable by the one or more processors, the one or more processors may conclude that the electronic device is in a semi-private environment and may initialize the audio output device to a quieter output volume. If the one or more sensors detect a plurality of unknown voices, the one or more processors may conclude that the electronic device is in a public environment and may initialize the audio output device to an even quieter volume. Additionally, the electronic device may deliver feedback to the user summoning the user to move closer to the electronic device to maintain privacy.

Thus, in one or more embodiments, after an audio input device receives audio input from one or more sources, the one or more sensors determine whether the audio input was received from a single source or a plurality of sources. Where the audio input is received from the single source, in one or more embodiments the one or more processors adjust an audio output sound pressure level of an audio output device to a first audio output sound pressure level. However, where the audio input is received from a plurality of sources, in one or more embodiments the one or more processors adjust the audio output sound pressure level of the audio output device to a second audio output sound pressure level that is less than the first audio output sound pressure level.

In one or more embodiments, where the audio input is received from a plurality of sources, the one or more processors attempt to identify, from signals from the one or more sensors, each source of the plurality of sources. In one or more embodiments, where at least one source of the plurality of sources is unidentified, the one or more processors can adjust the audio output sound pressure level of the audio output device to a third audio output sound pressure level that is different from the second audio output sound pressure level. In one or more embodiments the third audio output sound pressure level that is less than from the second audio output sound pressure level.

In one or more embodiments, the one or more processors can estimate a sound pressure level of the audio input when emanating from the source by inferring an acoustical path loss between the user's mouth and the audio input device, the user's ear and the audio output device, or combinations thereof, and can adjust the audio output device to respond in a volume that results in the same loudness at the ear, as the audio input received the audio input from the user's mouth. This is known as volume matching.

Thus, in one or more embodiments the one or more processors determine a received sound pressure level of the audio input at the audio input device. In one or more embodiments, the one or more processors then estimate an acoustic attenuation level of the audio input as a function of the distance between one or more physical features of the user and the electronic device. This acoustic attenuation level of the audio input can also be a function of one or more barriers between the user and the electronic device, such as when a shirt, sweater, or jacket is covering the electronic device when being worn on the wrist, or when the electronic device is in a pocket or purse. The adjustment of the audio output sound pressure level of an audio output device to mimic the sound pressure level of the audio input when emanating from the source can then comprise adjusting the audio output sound pressure level of the audio output device to the received sound pressure level plus the acoustic attenuation level, and so forth.

In one or more embodiments, the electronic device assesses a distance to the mouth and ear of the user, respectively, such as by capturing images of these physical features with an imager. The mouth of the user is a "source output" of the user, while the ear is a "source input" of the user, who is the source. In one or more embodiments, the one or more sensors determine another distance between this source input of the source and the audio input device decreasing. In one or more embodiments, when this occurs the one or more processors reduce the audio output sound pressure level of the audio output device.

It should be noted that inputs such as received audio input sound pressure level, distance between source input and/or source output and audio input and/or audio output of the electronic device, ambient noise level, environmental status, and other inputs can be used alone or in combination to mimic the emanating audio input sound pressure level and/or initialize an audio output to a predefined audio output sound pressure level. Other inputs and functions by which estimations of emanating audio input sound pressure level and/or adjustments of audio output sound pressure level will be described and illustrated below. Still others will be obvious to those of ordinary skill in the art having the benefit of this disclosure.

Turning now to FIG. 1, illustrated therein are one or more method steps in accordance with one or more embodiments of the disclosure. Beginning at step 101, a user 106 is shown delivering audio input 109 to an electronic device 108. In this illustrative embodiment, the electronic device 108 receiving the audio input 109 is a wearable electronic device. However, in other embodiments, the electronic device 108 receiving the audio input 109 may not be a wearable device.

Illustrating by example, at step 101 the electronic device 108 receiving the audio input 109 is a companion device to a non-wearable electronic device 107, shown here as a smartphone. In another embodiment, the non-wearable electronic device 107 may receive the audio input 109 and perform the operations of FIG. 1 that are associated with electronic device 108 for illustration purposes. While shown as a companion device to the smartphone, in other embodiments electronic device 108 is a standalone device that has no companion device. Where configured as a companion device, electronic device 108 can use processing power of the non-wearable electronic device, thereby reducing its component and processing power requirements. Other configurations for an electronic device 108 capable of receiving audio input 109 will be obvious to those of ordinary skill in the art having the benefit of this disclosure.

As shown at step 101, when the electronic device 108 receives the audio input 109, one or more processors of the electronic device 108 cause an audio output device to deliver audio output 110. Here, the electronic device 108 is performing a voice assistant function by receiving the audio input 109, determining, with one or more processors of the electronic device 108, an appropriate response to the audio input 109, and then causing the audio output device to deliver the audio output 110 comprising a response to the audio input 109.

In this simple illustration, the user 106, who constitutes the source of the audio input 109 received by an audio input device of the electronic device 108, delivers the audio input 109 from a source output 111 (the user's mouth in this example), with that audio input 109 comprising the question, "Who won the game?" In response, one or more processors of the electronic device 108 then employ a wireless communication device to wirelessly electronically communicate with one or more remote servers to obtain the answer to this inquiry, which constitutes a user command. As shown at step 101 of FIG. 1, the one or more processors of the electronic device 108 then cause the audio output device to deliver or to output audio output 110 to a source input (the user's ear in this example) comprising the answer, "Tech won—7-2."

In one or more embodiments, the audio input 109 received by the audio input device of the electronic device 108 emanates from the source output 111 of the source at a certain sound pressure level 113. The audio input device of the electronic device 108 receives this audio input 109 at step 101.

At step 102, when the audio input 109 is received from the source output 111 of the source, one or more processors of the electronic device 108 estimate the sound pressure level 113 of the audio input 109 when emanating from the source output 111 of the source, which is the user 106 in this example. At step 103, the one or more processors adjust an audio output sound pressure level 114 of an audio output device to mimic the sound pressure level 113 of the audio input 109 when emanating from the source output 111 of the source.

As shown at step 101, the audio output device of the electronic device 108 then outputs or otherwise delivers the audio output 110 at the audio output sound pressure level 114 in response to receiving the audio input 109 from the source, i.e., the user 106. Since the user 106 delivers the audio input 109 asking, "Who won the game?" at a sound pressure level 113 corresponding to a conversational tone, the audio output device of the electronic device 108 delivers the audio output 110 at an audio output sound pressure level mimicking this conversational tone sound pressure level 113 in response to receiving the audio input 109 from the source. Thus, the audio output device of the electronic device 108 outputs the audio output 110 stating, "Tech won—7-2" in the conversational tone, thereby mimicking the user 106.

At step 105, a stranger 115 has entered the environment 116 of the electronic device 108 and the user 106. Desiring privacy to prevent the stranger 115 from overhearing her interactions with the electronic device 108, the user 106 has moved both the source output 111 and the source input 112 closer to the electronic device 108. Additionally, the user 106 has reduced the sound pressure level 117 emanating from the source output 111.

Sensing that the stranger 115 may be up to no good, the user delivers audio input 118 at the reduced sound pressure level 117 to the electronic device 108, requesting the electronic device 108 to call her friend, Buster. The electronic device 108 receives this audio input 118 at a received audio input sound pressure level 119 at step 105. As will be explained in more detail below, in one or more embodiments the received audio input sound pressure level 119 is the sound pressure level 117 of the audio input 118 as emanating from the source output 111 of the source, less an acoustic attenuation level 121 lost to the environment 116 as the audio input 118 travels from the source output 111 to the audio input of the electronic device 108.

Executing steps 102 and 103 again, the one or more processors estimate an emanating audio input sound pressure level occurring when the audio input 118 emanated from the source, here sound pressure level 117. The one or more processors then adjust the audio output sound pressure level 114 of the audio output device to mimic the emanating sound pressure level 117 of the audio input 118.

In one or more embodiments, this estimation occurs as a function of the received sound pressure level 119. Illustrating by example, in one or more embodiments the one or more processors of the electronic device 108 first determine, using signals from one or more sensors of the electronic device, the magnitude of the received sound pressure level 119. In one or more embodiments, the adjustment occurring at step 103 can simply comprise adjusting the audio output sound pressure level 114 to be the received audio input sound pressure level 119.

In other embodiments, the estimation can take into account other factors monitored and determined at step 104. Illustrating by example, in one or more embodiments step 104 can comprise one or more sensors of the electronic device 108 determining a distance 122 between a source output 111 of the source and the audio input device of the electronic device 108. Where this step 104 is performed, the estimating occurring at step 102 can occur a function of the distance 122.

In a simple embodiment, step 104 can comprise simply determining, with the one or more sensors, that the distance 122 between the source output 111 and the audio input device of the electronic device 108 is decreasing. Thereafter, step 103 can comprise the one or more processors reducing the audio output sound pressure level 114 of the audio output device of the electronic device 108 in response.

In another embodiment, step 104 can comprise simply determining, with the one or more sensors, that the distance 122 between the source input 112 and the audio input device of the electronic device 108 is decreasing. Thereafter, step 103 can comprise the one or more processors reducing the audio output sound pressure level 114 of the audio output device of the electronic device 108 in response.

In still other embodiments, the adjustment occurring at step 103 can use the distance 122 in other ways. For example, embodiments of the disclosure contemplate that in many situations some of the acoustic energy of the emanating sound pressure level 117 will be lost as the audio input 118 travels through air from the source output 111 to the audio input of the electronic device 108. Accordingly, in one or more embodiments where the one or more processors of the electronic device 108 determine the received sound pressure level 119, the estimation of step 102 can comprise estimating the acoustic attenuation level 121 of the audio input 118 as a function of the distance 122. Thereafter, the adjustment of step 103 can comprise adjusting the audio output sound pressure level 114 of the audio output device of the electronic device to the received sound pressure level 119 plus the acoustic attenuation level 121. This results in the sound pressure level received at the source input 112 being substantially the same as the received audio input sound pressure level 119, thereby mimicking the user 106.

The one or more processors then cause the audio output device to deliver audio output 120 in response to the audio input 118 at the reduced audio output sound pressure level 114. In this illustrative example, the audio output device of the electronic device 108 responds at the reduced audio output sound pressure level 114 with audio output 120 confirming that Buster is being called.

The mimic function offered by embodiments of the disclosure can be seen in FIG. 1 by comparing step 101 and step 105. At step 101, the audio output device of the electronic device 108 outputs or otherwise delivers the audio output 110 at the audio output sound pressure level 114 in response to receiving the audio input 109 from the source. Since the user 106 delivers the audio input 109 asking, "Who won the game?" at a sound pressure level 113 corresponding to a conversational tone, the audio output device of the electronic device 108 delivers the audio output 110 at an audio output sound pressure level mimicking this conversational tone sound pressure level 113 in response to receiving the audio input 109 from the source. Thus, the audio output device of the electronic device 108 outputs the audio output 110 stating, "Tech won—7-2" in the conversational tone, thereby mimicking the user 106.

However, in the transition from step 101 to step 105, one or more sensors of the electronic device 108 determine that the received sound pressure level 119 has decreased or is decreasing at step 104. Accordingly, the one or more processors reduce the audio output sound pressure level 114 of the audio output device of the electronic device 108 at step 104. The audio output device of the electronic device 108 responds at step 104 at the reduced audio output sound pressure level 114 with audio output 120 confirming that Buster is being called.

The primary illustrative examples of FIG. 1 perform the estimating operation of step 102, the adjusting operation of step 103, and additional adjustment operations of step 104 primarily as a function of sound pressure level, e.g., the receives sound pressure level 119, the distance 122 between one or more of the user 106, the source output 111 of the user 106, and/or the source input 112 of the user 106. These inputs can be used to calculate secondary parameters, one example of which is the acoustic attenuation level 121 of the audio input 118 as a function of the distance 122.

However, as shown at step 104, embodiments of the disclosure are not so limited. Numerous other inputs can be used, either in the estimating operation of step 102 or the adjustment operation of step 103 or step 104. Examples of these inputs include the direction from which the audio input 109,118 was received, the frequency of the audio input 109,118, ambient noise levels within the environment 116 of the electronic device 108, whether the environment 116 about the electronic device 108 is identified as being public, private, or semi-private, or other inputs. Many examples of these inputs will be described in more detail below with reference to FIG. 4. Still others will be obvious to those of ordinary skill in the art having the benefit of this disclosure.

Figure 2:
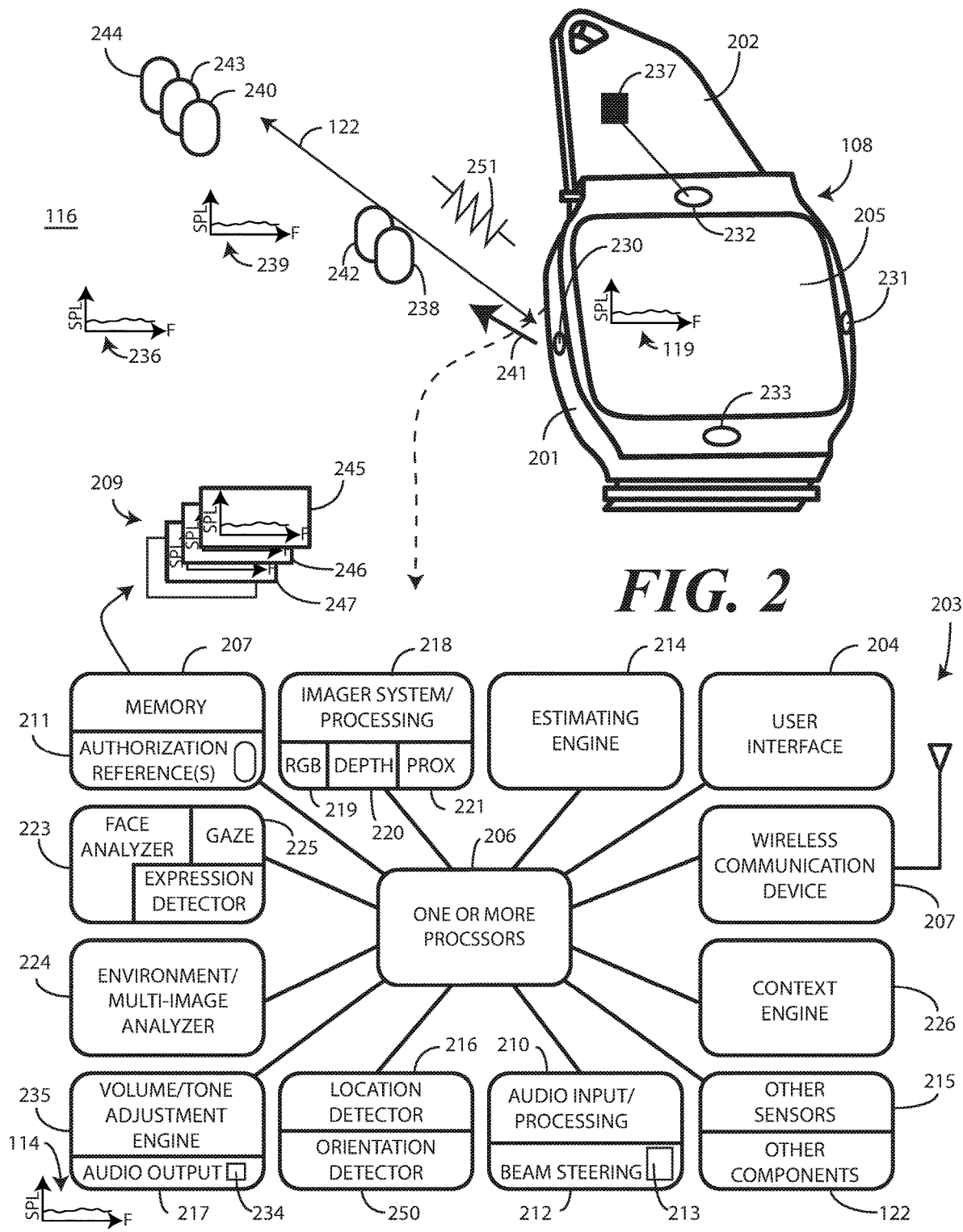
FIG. 2 illustrates one explanatory electronic device configured in accordance with one or more embodiments of the disclosure.

Turning now to FIG. 2, illustrated therein is one explanatory electronic device 108 configured in accordance with one or more embodiments of the disclosure. As noted above, in this illustrative embodiment the electronic device 108 is configured as a wearable device. As shown in FIG. 2, the electronic device 108 includes a housing 201 and one or more straps 202, which allow the electronic device 108 to be worn around a wrist as a watch or folded over and clipped to a garment as shown in FIG. 1. Other types of wearable electronic devices and/or other mechanical configurations of wearable electronic devices will be obvious to those of ordinary skill in the art having the benefit of this disclosure.

In other embodiments, the electronic device 108 is configured as a non-wearable device. For instance, instead of being configured with the housing 201 and one or more straps 202 of FIG. 2, the electronic device 108 could have been configured as a smartphone, such as that shown at non-wearable electronic device 107 of FIG. 1. Alternatively, the electronic device 108 could be configured as a tablet computer, a dedicated voice assistant device, a gaming device, a multimedia device, or other device.

Also illustrated in FIG. 2 is one explanatory block diagram schematic 203 of the electronic device 108. In one or more embodiments, the block diagram schematic 203 is configured as a printed circuit board assembly disposed within the housing 201 or one or more straps 202 of the electronic device 108. Various components can be electrically coupled together by conductors or a bus disposed along one or more printed circuit boards. It should be noted that the block diagram schematic 203 includes many components that are optional, but which are included in an effort to demonstrate how varied electronic devices configured in accordance with embodiments of the disclosure can be.

Illustrating by example, in one or more embodiments the electronic device 108 includes an audio input device 213 to receive audio input and an audio output device 217 to deliver audio output. Where the electronic device 108 is configured to be purely a voice assistant device, a display 205 would be optional, in it is not required for this voice-based user interaction convention.

Thus, it is to be understood that the block diagram schematic 203 of FIG. 1 is provided for illustrative purposes only and for illustrating components of one electronic device 108 in accordance with embodiments of the disclosure. The block diagram schematic 203 of FIG. 1 is not intended to be a complete schematic diagram of the various components required for an electronic device 108. Therefore, other electronic devices in accordance with embodiments of the disclosure may include various other components not shown in FIG. 1, or may include a combination of two or more components or a division of a particular component into two or more separate components, and still be within the scope of the present disclosure.

The illustrative block diagram schematic 203 of FIG. 2 includes many different components. Embodiments of the disclosure contemplate that the number and arrangement of such components can change depending on the particular application. For example, a wearable electronic device may have fewer, or different, components from a non-wearable electronic device. Similarly, an electronic device configured as a dedicated voice assistant may have fewer, or different, components from a smartphone, and so forth. Accordingly, electronic devices configured in accordance with embodiments of the disclosure can include some components that are not shown in FIG. 2, and other components that are shown may not be needed and can therefore be omitted.

The illustrative block diagram schematic 203 includes a user interface 204. In one or more embodiments, the user interface 204 includes a display 205, which may optionally be touch-sensitive. In one embodiment, users can deliver user input to the display 205 of such an embodiment by delivering touch input from a finger, stylus, or other objects disposed proximately with the display 205. In one embodiment, the display 205 is configured as an active matrix organic light emitting diode (AMOLED) display. However, it should be noted that other types of displays, including liquid crystal displays, suitable for use with the user interface 204 would be obvious to those of ordinary skill in the art having the benefit of this disclosure.

In one embodiment, the electronic device 108 includes one or more processors 206. In one embodiment, the one or more processors 206 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 203. Each of the application processor and the auxiliary processor(s) can be configured to process and execute executable software code to perform the various functions of the electronic device 108 with which the block diagram schematic 203 operates. A storage device, such as memory 207, can optionally store the executable software code used by the one or more processors 206 during operation.

In this illustrative embodiment, the block diagram schematic 203 also includes a communication circuit 208 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 208 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 208 can include wireless communication circuitry, one of a receiver, a transmitter, or transceiver, and one or more antennas.

In one embodiment, the one or more processors 206 can be responsible for performing the primary functions of the electronic device with which the block diagram schematic 203 is operational. For example, in one embodiment the one or more processors 206 comprise one or more circuits operable with the user interface 204 to present presentation information to a user. Additionally, the one or more processors 206 can be operable with an audio output device 217 to deliver audio output 237 to a user. The executable software code used by the one or more processors 206 can be configured as one or more modules 209 that are operable with the one or more processors 206. Such modules 209 can store instructions, control algorithms, and so forth.

In one or more embodiments, the block diagram schematic 203 includes an audio input/processor 210. The audio input/processor 210 is operable to receive audio input 238 from a source, such as a person, authorized user, plurality of persons within an environment 116 about the electronic device 108, from the environment 116 about the electronic device 108, or combinations thereof. The audio input/processor 210 can include hardware, executable code, and speech monitor executable code in one embodiment. The audio input/processor 210 can be operable with one or more predefined authentication references 211 stored in memory 207.

With reference to audio input 238, the predefined authentication references 211 can comprise representations of basic speech models, representations of trained speech models, or other representations of predefined audio sequences that are used by the audio input/processor 210 to receive and identify voice commands that are received with audio input 238 captured by an audio input device 213. In one embodiment, the audio input/processor 210 can include a voice recognition engine. Regardless of the specific implementation utilized in the various embodiments, the audio input/processor 210 can access various speech models stored with the predefined authentication references 211 to identify speech commands.

The audio input/processor 210 can include a beam steering engine 212. The beam steering engine 212 can be operable with one or both of an audio input device 213, such as one or more microphones, and/or an audio output device 217, such as one or more loudspeakers. When functioning with the audio input device 213, the beam steering engine 212 can process audio input 238 from, for example, one or more microphones defining a virtual microphone. This virtual microphone can define an acoustic reception cone that can be virtually "steered" around the electronic device 108. Alternatively, actual steering can occur as well, such as switching between a left microphone and right microphone or a front and back microphone, or switching various microphones ON and OFF individually. In one or more embodiments, two or more microphones can be included for selective beam steering by the beam steering engine 212.

Illustrating by example, a first microphone 230 can be located on a first side of the electronic device 108 for receiving audio input from a first direction, while a second microphone 231 can be placed on a second side of the electronic device 108 for receiving audio input 238 from a second direction. These microphones can be "steered" by selectively turning them ON and OFF.

The beam steering engine 212 can then select between the first microphone 230 and the second microphone 231 to beam steer audio reception toward an object, such as a user delivering audio input 238. This beam steering can be responsive to input from other sensors 215, such as imagers, facial depth scanners, thermal sensors, or other sensors. For example, an imager can estimate a location of a person's face and deliver signals to the beam steering engine 212 alerting it in which direction to focus the acoustic reception cone and/or steer the first microphone and the second microphone, thereby adding confirmation to audio steering and saving time. Where multiple people are around the electronic device 108, as was the case in step (105) of FIG. 1, this steering advantageously directs a beam reception cone to the authorized user.

Alternatively, the beam steering engine 212 can process and combine the signals from two or more microphones to perform beam steering. The one or more microphones can be used for voice commands. In response to control of the one or more microphones by the beam steering engine 212, a user location direction can be determined. The beam steering engine 212 can then select between the first microphone 230 and the second microphone 231 to beam steer audio reception toward the user. Alternatively, the audio input/processor 210 can employ a weighted combination of the microphones to beam steer audio reception toward the user.

When functioning with the audio output device 217, the beam steering engine 212 can deliver audio output to, for example, one or more loudspeakers 234 such that the one or more loudspeakers define a directional loudspeaker. In one or more embodiments, the one or more loudspeakers include at least two ultrasound transducers 232,233 that allow audio output 237 to be delivered to specific locations where outputs from the ultrasound transducers 232,233 intersect and generate an audible beat. In one or more embodiments, this allows the beam steering engine 212 to steer audio output 237 in situations where not everyone within the environment of the electronic device 108 needs to hear the audio output 237.

Advantageously, when the audio output 237 from at least two ultrasound transducers 232,233 converges/beat in a specific location, source can deliver audio input comprising a user input command such as speaking the words, "play here." When this occurs, the first microphone 230 and second microphone 231 can receive and assess this audio input 238 comprising the audible command. Alternatively, an imager 219 can analyze lip movement from captured images to identify the voice command of the audio input 238.

Regardless of how the audio input 238 is received, in one or more embodiments the directional output of each ultrasound transducer 232,233 can be adjusted to point at, and define, a sound "beat spot" at the location where the user uttering the voice command is located. This allows that user to hear audio output 237 while others nap, read the paper, knit, crochet, work crossword puzzles, and so forth. In alternate embodiments, the location at which the audio output 237 from where the ultrasound transducers 232,233 intersect can be controlled as a function of the distance of the person nearest the media consumption device, as detected by an imager 219 or other sensor 215.

While multiple audio transducers can be steered via phase shift, and ultrasonic transducers can be steered based upon a beat principle where ultrasonic sound becomes audible where two ultrasound transducers meet in physical space, in still other embodiments the audio output device 217 will simply comprise one or more conventional loudspeakers 234. It is where such loudspeakers 234 can be heard by multiple persons, rather than by a single person, where the method of estimating a sound pressure level 239 of the audio input 238 when emanating from the source 240 and adjusting an audio output sound pressure level 114 of an audio output device 217 to mimic the sound pressure level 239 of the audio input 238 when emanating from the source 240 begins to shine due to the fact that no beam steering of the audio output device 217 is required to maintain privacy.

In one embodiment, the audio input/processor 210 is configured to implement a voice control feature that allows the electronic device 108 to function as a voice assistant device, which is a digital assistant using voice recognition, speech synthesis, and natural language processing to receive audio input 238 comprising a voice command from a source, determine the appropriate response to the voice command, and then deliver the response in the form of audio output 237 in response to receiving the audio input 238 from the source 240. When so configured, a user can cause the emanation of the audio input 238 from their mouth to cause the one or more processors 206 of the electronic device 108 to execute a control operation. One example of this was shown above with reference to FIG. 1, where the electronic device 108 delivered audio output (120) confirming that Buster was being called in response to audio input (118) requesting that the electronic device 108 call Buster.

In another embodiment, a user may say, "Authenticate Me Now." This statement comprises a device command requesting the one or more processors 206 to authenticate a user. Consequently, this device command can cause the one or more processors 206 begin the authentication process. In short, in one or more embodiments the audio input/processor 210 listens for voice commands, processes the commands and, in conjunction with the one or more processors 206, performs one or more control operations, such as delivering audio output 237, in response to receiving audio input 238.

Various sensors 215 can be operable with the one or more processors 206. A first example of a sensor that can be included with the various sensors 215 is a touch sensor. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 206, to detect an object in close proximity with or touching the surface of the display 205 or the housing 201 of the electronic device 108 by establishing electric field lines between pairs of capacitive sensors and then detecting perturbations of those field lines.

Another example of a sensor 215 is a geo-locator that serves as a location detector 216. In one embodiment, location detector 216 is able to determine location data when authenticating a user. Location can be determined by capturing the location data from a constellation of one or more earth orbiting satellites, or from a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLO-NASS) in Russia, and other similar satellite positioning systems. The satellite positioning systems based location fixes of the location detector 216 autonomously or with assistance from terrestrial base stations, for example those associated with a cellular communication network or other ground based network, or as part of a Differential Global Positioning System (DGPS), as is well known by those having ordinary skill in the art. The location detector 216 may also be able to determine location by locating or triangulating terrestrial base stations of a traditional cellular network, such as a CDMA network or GSM network, or from other local area networks, such as Wi-Fi networks.

One or more motion detectors can be configured as an orientation detector 250 that determines an orientation and/or movement of the electronic device 108 in three-dimensional space. Illustrating by example, the orientation detector 250 can include an accelerometer, gyroscopes, or other device to detect device orientation and/or motion of the electronic device 108. Using an accelerometer as an example, an accelerometer can be included to detect motion of the electronic device. Additionally, the accelerometer can be used to sense some of the gestures of the user, such as one talking with their hands, running, or walking.

The orientation detector 250 can determine the spatial orientation of an electronic device 108 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 108.

An imager processor system 218 can be included in the electronic device 108 and can be operable with the one or more processors 206. The imager processor system can include one or more sensors 215. For example, in one or more embodiments the one or more sensors 215 included with the imager processor system 218 comprise one or more of an imager 219, a depth imager 220, and, optionally, one or more proximity sensors 221.

In one embodiment, the imager 219 comprises a two-dimensional imager configured to receive at least one image of a person within an environment of the electronic device 108. In one embodiment, the imager 219 comprises a two-dimensional Red-Green-Blue (RGB) imager. In another embodiment, the imager 219 comprises an infrared imager. Other types of imagers suitable for use as the imager 219 of electronic device 108 will be obvious to those of ordinary skill in the art having the benefit of this disclosure.

The one or more proximity sensors 221 can take various forms. In one or more embodiments, the one or more proximity sensors 221 fall in to one of two camps: active proximity sensors and "passive" proximity sensors. Either the proximity detector components or the proximity sensor components can be generally used for distance determination, changes in distance between a source and the electronic device 108, a source output (111) of the source and the electronic device 108, a source input (112) of the source and the electronic device 108, other physical features of a source and the electronic device 108, and other user interface protocols, some examples of which will be described in more detail below.

As used herein, a "proximity sensor component" comprises a signal receiver only that does not include a corresponding transmitter to emit signals for reflection off an object to the signal receiver. A signal receiver only can be used due to the fact that a user's body or other heat generating object external to the electronic device 108 serves as the transmitter. Illustrating by example, in one embodiment the proximity sensor components comprise a signal receiver to receive signals from objects external to the housing 201 of the electronic device 108.

In one embodiment, the signal receiver is an infrared signal receiver to receive an infrared emission from a source, such as a human being, when the human being is approaching the electronic device 108. In one or more embodiments, the proximity sensor component is configured to receive infrared wavelengths of about four to about ten micrometers. This wavelength range is advantageous in one or more embodiments in that it corresponds to the wavelength of heat emitted by the body of a human being.

Additionally, detection of wavelengths in this range is possible from farther distances than, for example, would be the detection of reflected signals from the transmitter of a proximity detector component. In one embodiment, the proximity sensor components have a relatively long detection range so as to detect heat emanating from a person's body when that person is within a predefined thermal reception radius. For example, the proximity sensor component may be able to detect a person's body heat from a distance of about fifteen feet in one or more embodiments. The ten-foot dimension can be extended as a function of designed optics, sensor active area, gain, lensing gain, and so forth.

Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level. Simulations show that a group of infrared signal receivers can operate with a total current drain of just a few microamps.

In one embodiment, the signal receiver of each proximity sensor component can operate at various sensitivity levels so as to cause the at least one proximity sensor component to be operable to receive the infrared emissions from different distances. For example, the one or more processors 206 can cause each proximity sensor component to operate at a first "effective" sensitivity so as to receive infrared emissions from a first distance. Similarly, the one or more processors 206 can cause each proximity sensor component to operate at a second sensitivity, which is less than the first sensitivity, so as to receive infrared emissions from a second distance, which is less than the first distance. The sensitivity change can be effected by causing the one or more processors 206 to interpret readings from the proximity sensor component differently.

By contrast, proximity detector components include a signal emitter and a corresponding signal receiver, which constitute an "active IR" pair. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

In one embodiment, the one or more proximity sensors 221 simply comprise a proximity sensor component. In another embodiment, the one or more proximity sensors 221 comprise a simple thermopile. In another embodiment, the one or more proximity sensors 221 comprise an infrared imager that captures the amount of thermal energy emitted by an object. In still other embodiments, the one or more proximity sensors 221 comprise a proximity detector component. Of course, combinations of these components can be used as the one or more proximity sensors 221. Moreover, other types of proximity sensors suitable for use with the electronic device 108 will be obvious to those of ordinary skill in the art having the benefit of this disclosure.

As with the one or more proximity sensors 221, the depth imager 220 can take a variety of forms. In a first embodiment, the depth imager 220 comprises a pair of imagers separated by a predetermined distance, such as three to four images. This "stereo" imager works in the same way the human eyes do in that it captures images from two different angles and reconciles the two to determine distance.

In another embodiment, the depth imager 220 employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment, the depth imager 220 comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained. Regardless of embodiment, the depth imager 220 adds a third "z-dimension" to the x-dimension and y-dimension defining the two-dimensional image captured by the imager 219, thereby enhancing the security of using a person's face as their password in the process of authentication by facial recognition.

In one or more embodiments, the imager processor system 218 can be operable with a face analyzer 223 and an environmental analyzer 224. The face analyzer 223 and/or environmental analyzer 224 can be configured to process an image or depth scan of an object and determine whether the object matches predetermined criteria by comparing the image or depth scan to one or more predefined authentication references 211 stored in memory 207.

For example, the face analyzer 223 and/or environmental analyzer 224 can operate as an authentication module configured with optical and/or spatial recognition to identify objects using image recognition, character recognition, visible recognition, facial recognition, color recognition, shape recognition, and the like. Advantageously, the face analyzer 223 and/or environmental analyzer 224, operating in tandem with the imager processor system 218, can be used as a facial recognition device to determine the identity of one or more persons detected within an environment about the electronic device 108.

In one embodiment when the imager processor system 218 detects a person, one or both of the imager 219 and/or the depth imager 220 can capture a photograph and/or depth scan of that person. The imager processor system 218 can then compare the image and/or depth scan to one or more predefined authentication references 211 stored in the memory 207. This comparison, in one or more embodiments, is used to confirm beyond a threshold authenticity probability that the person's face—both in the image and the depth scan—sufficiently matches one or more of the predefined authentication references 211 stored in the memory 207 to authenticate a person as an authorized user of the electronic device 108.

Beneficially, this optical recognition performed by the imager processor system 218 operating in conjunction with the face analyzer 223 and/or environmental analyzer 224 allows access to the electronic device 108 only when one of the persons detected about the electronic device 108 are sufficiently identified as an authorized user of the electronic device 108. Accordingly, in one or more embodiments the one or more processors 206, working with the imager processor system 218 and the face analyzer 223 and/or environmental analyzer 224 can determine whether at least one image captured by the imager 219 matches a first predefined criterion, and whether at least one facial depth scan captured by the depth imager 220 matches a second predefined criterion. The first criterion may be a skin color, eye color, and hair color, while the second criterion is a predefined facial shape, ear size, and nose size, and so forth. In one or more embodiments, the one or more processors 206 authenticate a person as an authorized user of the electronic device 108 when the at least one image matches the first predefined criterion and the at least one facial depth scan matches the second predefined criterion.

A gaze detector 225 can be operable with the imager processor system 218 operating in conjunction with the face analyzer 223. The gaze detector 225 can comprise sensors for detecting the user's gaze point. The gaze detector 225 can optionally include sensors for detecting the alignment of a user's head in three-dimensional space. Electronic signals can then be processed for computing the direction of user's gaze in three-dimensional space. The gaze detector 225 can further be configured to detect a gaze cone corresponding to the detected gaze direction, which is a field of view within which the user may easily see without diverting their eyes or head from the detected gaze direction. The gaze detector 225 can be configured to alternately estimate gaze direction by inputting images representing a photograph of a selected area near or around the eyes. It will be clear to those of ordinary skill in the art having the benefit of this disclosure that these techniques are explanatory only, as other modes of detecting gaze direction can be substituted in the gaze detector 225 of FIG. 2.

The face analyzer 223 can include its own image/gaze detection-processing engine as well. The image/gaze detection-processing engine can process information to detect a user's gaze point. The image/gaze detection-processing engine can optionally also work with the depth scans to detect an alignment of a user's head in three-dimensional space. Electronic signals can then be delivered from the imager 219 or the depth imager 220 for computing the direction of user's gaze in three-dimensional space. The signals can be used to detect a gaze cone corresponding to the detected gaze direction, which is a field of view within which the user may easily see without diverting their eyes or head from the detected gaze direction. Gaze can alternatively be estimated by inputting images representing a photograph of a selected area near or around the eyes. It can also be valuable to determine if the user wants to be authenticated by looking directly at device. The image/gaze detection-processing engine can determine not only a gazing cone but also if an eye is looking in a particular direction to confirm user intent to be authenticated.

Other components 222 operable with the one or more processors 206 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as the one or more loudspeakers 234, the ultrasound transducers 232,233 (where included), or other alarms and/or buzzers. The other components 222 can also include a mechanical output component such as vibrating or motion-based mechanisms.

The other components 222 can optionally include a barometer operable to sense changes in air pressure due to elevation changes or differing pressures of the electronic device 108. Where included, in one embodiment the barometer includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

The other components 222 can also optionally include a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 108. Similarly, a temperature sensor can be configured to monitor temperature about an electronic device.

In one or more embodiments, the one or more processors 206 can define one or more process engines. Examples of these process engines include a context engine 226, an estimating engine 214, and an adjustment engine 235. Each engine can be a component of the one or more processors 206, operable with the one or more processors 206, defined by the one or more processors 206, and/or integrated into the one or more processors 206. Other configurations for these engines, including as software or firmware modules operable on the one or more processors 206, will be obvious to those of ordinary skill in the art having the benefit of this disclosure.

For instance, a context engine 226 can be operable with the various sensors to detect, infer, capture, and otherwise determine persons and actions that are occurring in an environment about the electronic device 108. For example, where included one embodiment of the context engine 226 determines assessed contexts and frameworks using adjustable algorithms of context assessment employing information, data, and events. These assessments may be learned through repetitive data analysis. Alternatively, a user may employ the user interface 204 to enter various parameters, constructs, rules, and/or paradigms that instruct or otherwise guide the context engine 226 in detecting multi-modal social cues, emotional states, moods, and other contextual information. The context engine 226 can comprise an artificial neural network or other similar technology in one or more embodiments.

In one or more embodiments, the context engine 226 is operable with the one or more processors 206. In some embodiments, the one or more processors 206 can control the context engine 226. In other embodiments, the context engine 226 can operate independently, delivering information gleaned from detecting multi-modal social cues, emotional states, moods, and other contextual information to the one or more processors 206. The context engine 226 can receive data from the various sensors. In one or more embodiments, the one or more processors 206 are configured to perform the operations of the context engine 226.

An estimating engine 214 can be operable with, or integrated in, the one or more processors 206 to estimate a sound pressure level 239 of audio input 238. In one or more embodiments, the estimating engine 214 estimates the sound pressure level 239 of audio input 238 when emanating from a source 240. This can occur in a variety of ways.

Illustrating by example, in one or more embodiments the one or more processors 206 determine, from signals received from the one or more sensors 215, a received sound pressure level 119 of audio input 238. In one or more embodiments, the estimating engine 214 can then estimate the sound pressure level 239 of the audio input 238 when emanating from the source 240 as a function of the received sound pressure level 119.

Once the estimating engine 214 estimates the sound pressure level 239 of the audio input 238 when emanating from the source 240, e.g., at the mouth of a user when the user is speaking the audio input 238, an adjustment engine 235, operable with, or integrated in, the one or more processors 206 can adjust an audio output sound pressure level 114 of the audio output device 217 to mimic the sound pressure level 239 of the audio input 238 when emanating from the source 240. For example, in one or more embodiments the adjustment engine 235 can adjust the audio output sound pressure level 114 of the audio output device 217 to the received sound pressure level 119.

In another embodiment, the estimating engine 214 can determine, from signals from the one or more sensors 215 and/or the audio input device 213, the received sound pressure level 119 decreasing. In one or more embodiments, when this occurs, the adjustment engine 235 can reduce the audio output sound pressure level 114 of the audio output device 217.

In one or more embodiments, the one or more processors 206 can optionally determine, from signals from the one or more sensors 215, a distance 122 between a source output (111) of the source 240 delivering the audio input 248 and the audio input device 213 of the electronic device 108. Illustrating by example, proximity detector components included with the one or more proximity sensors 221 of the one or more sensors 215 can be used, for example, to compute the distance 122 to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

Alternatively, the depth imager 220 can take consecutive depth scans of an estimate the distance 122 between the source 240 and the audio input device 213 of the electronic device 108. Similarly, the imager 219 can capture successive images, with the one or more processors 206 performing image analysis on the one or more images to compare the same to identifiable objects, e.g., a car or truck, found in the images to determine the distance 122. Other techniques for determining the distance 122 between the source 240 and the electronic device 108 will be obvious to those of ordinary skill in the art having the benefit of this disclosure.

In one or more embodiments when the distance 122 between the source output (111) of a source 240 and the audio input device 213 of the electronic device 108 is determined, the estimating engine 214 can estimate the sound pressure level 239 of the audio input 238 when emanating from the source 240 as a function of the distance 122. Illustrating by example, in one or more embodiments the estimating engine 214 determines, from the one or more sensors 215, that the distance 122 between the source output (111) of a source 240 and the audio input device 213 of the electronic device 108 is decreasing. Where this occurs, in one or more embodiments the adjustment engine 235 can reduce the audio output sound pressure level 114 of the audio output device 217.

In still another embodiment, the one or more processors 206 can again determine, from signals received from the one or more sensors 215, a received sound pressure level 119 of audio input 238. In one or more embodiments, the estimating engine 214 can then estimate the sound pressure level 239 of the audio input 238 when emanating from the source 240 as a function of the received sound pressure level 119. Illustrating by example, in one or more embodiments the one or more processors 206 determine the received audio input sound pressure level 119 of the audio input 238 increasing, In one or more embodiments, where or when this occurs the adjustment engine 235 can increase the audio output sound pressure level 114 of the audio output device 217.

In one or more embodiments, the estimating engine 214 can estimate an acoustic attenuation level (121) of the audio input 238 as a function of the distance 122. For example, the estimating engine 214 can estimate the acoustic attenuation level (121) using the inverse square law, which suggests that the sound pressure level associated with acoustic sound, in decibels, will reduce its intensity by the square of the distance the sound travels. Thus, if the sound travels two meters, it will have only one fourth of its original intensity, and so forth. Other techniques for estimating the acoustic attenuation level (121) as a function of the distance 122 will be obvious to those of ordinary skill in the art having the benefit of this disclosure. In one or more embodiments, the adjustment engine 235 can then adjust the audio output sound pressure level 114 of the audio output device 217 to an amount equal to or less than the received sound pressure level 119 plus the acoustic attenuation level (121).

In one or more embodiments, the estimating engine 214 can estimate an acoustic attenuation level (121) of the audio input 238 as a function of one or more barriers between the user and the electronic device, such as when a shirt, sweater, or jacket is covering the electronic device when being worn on the wrist, or when the electronic device is in a pocket or purse. For example, the estimating engine 214 can estimate the acoustic attenuation level (121) by estimating a path-loss attenuation due to one or more materials being present between the user and the electronic device 108, such as would occur when the electronic device 108 is in a pocket or bag. If the acoustical path between the user and electronic device 108 passes through a material such as a textile fabric, in one or more embodiments the estimating engine 214 can include a factor expressing the losses caused by this textile fabric in the acoustic attenuation level (121) determination.

In one or more embodiments, the electronic device 108 can determine such a covered or in-pocket or in-bag condition using the one or more sensors 215. Illustrating by example, an imager 219 might capture an image indicating the electronic device 108 is in a bag. Alternatively, a light sensor may detect the absence of light to determine the electronic device 108 is situated in a pocket or bag, or alternatively is covered by a sleeve. A proximity sensor can be used in a similar fashion. Other techniques for estimating the acoustic attenuation level (121) as a function of one or more barriers between the user and the electronic device, such as when a shirt, sweater, or jacket is covering the electronic device when being worn on the wrist, or when the electronic device is in a pocket or purse will be obvious to those of ordinary skill in the art having the benefit of this disclosure. In one or more embodiments, the adjustment engine 235 can then adjust the audio output sound pressure level 114 of the audio output device 217 to an amount equal to or less than the received sound pressure level 119 plus the acoustic attenuation level (121).

In still another embodiment, the one or more processors 206 can determine, from electrical signals from the one or more sensors 215, an ambient noise level 236 in an environment 116 about the electronic device 108. Where this occurs, the estimating engine 214 can estimate the sound pressure level 239 of the audio input 238 when emanating from the source 240 as a function of the ambient noise level 236 in one or more embodiments. Illustrating by example, the estimating engine 214 can determine, from electrical signals from the one or more sensors 215, that the ambient noise level 236 is decreasing. Where this occurs, the adjustment engine 235 can reduce the audio output sound pressure level 114 of the audio output device 217 in one or more embodiments.

Recall from above that in one or more embodiments a beam steering engine 212 can determine a direction 241 from which audio input 238 is received. In one or more embodiments, the estimating engine 214 can estimate the sound pressure level 239 of the audio input 238 when emanating from the source 240 as a function of the direction 241. For instance, when the direction 241 defines a large angle, e.g., greater than forty-five degrees, from a reference axis oriented normally with the audio input device 213, the estimating engine 214 may conclude that the source output (111) of the source 240 is farther away from the audio input device 213. Accordingly, the adjustment engine 235 may increase the audio output sound pressure level 114 of the audio output device 217 in one or more embodiments.

By contrast, when the direction 241 defines a small angle, e.g., less than fifteen to twenty degrees, from the reference axis oriented normally with the audio input device 213, the estimating engine 214 may conclude that the source output (111) of the source 240 is closer to the audio input device 213. Accordingly, the adjustment engine 235 may decrease the audio output sound pressure level 114 of the audio output device 217 in one or more embodiments.

In one or more embodiments, a combination of direction and distance can be used as inputs into the estimating engine 214 and the adjustment engine 235. Illustrating by example, when the distance 122 between the source output (111) of a source 240 and the audio input device 213 of the electronic device 108 is determined, the estimating engine 214 can estimate the sound pressure level 239 of the audio input 238 when emanating from the source 240 as a function of the distance 122, as noted above.

In one or more embodiments where this is the case, the estimating engine 214 determines, from the one or more sensors 215, that the distance 122 between the source output (111) of a source 240 and the audio input device 213 of the electronic device 108 is decreasing. In one or more embodiments, the estimating engine 214 also determines, from the one or more sensors 215, that the direction 241 is also changing. Embodiments of the disclosure contemplate that when a user moves their head toward the electronic device 108, in many instances both the distance 122 from which the audio input 238 is received and the direction 241 from which the audio input 238 is received will change. Accordingly, in one or more embodiments the adjustment engine 235 can reduce the audio output sound pressure level 114 of the audio output device 217 only where both the distance 122 between the source 240 and the audio input device 213 decreases and the direction 241 from which the audio input 238 was received changes.

Recall from above that by using the predefined authentication references 211, which can include basic speech models, representations of trained speech models, or other representations of predefined audio sequences, the audio input/processor 210 to receive and identify voice commands that are received with audio input 238 captured by an audio input device 213 by functioning as a voice recognition engine. This feature can be used in one or more embodiments to provide a privacy function as well.

For example, in one or more embodiments the audio input/processor 210 receives, from the audio input device 213, additional audio input 242 from one or more additional sources 243,244. From this additional audio input 242, in one or more embodiments the audio input/processor 210 and/or one or more processors 206 can attempt to identify each additional source 243,244 of the one or more additional sources 243,244. In this manner, the one or more processors 206 can determine whether the sources 240,243,244 are known sources, e.g., an authorized user of the electronic device 108 and one or more known acquaintances, or if some of the sources 243,244 are unknown individuals.

Whether the persons are known or unknown can serve as an input to the adjustment engine 235 regarding whether to reduce the audio output sound pressure level 114 of the audio output device 217. For example, if the one or more processors 206 determine that the additional audio input 242 comprises voices from a plurality of sources 240,243,244, but that those voices are all identifiable by the one or more processors 206, the one or more processors 206 may conclude that the electronic device 108 is in a semi-private environment.

In one or more embodiments, the adjustment engine 235 can reduce the audio output sound pressure level 114 of the audio output device 217 when the additional audio input 242 comprises voices from a plurality of sources 240,243,244. However, where at least one of the additional sources 243,244 is unidentifiable, in one or more embodiments the adjustment engine 235 can further reduce the audio output sound pressure level 114 of the audio output device 217, with the presumption being that known sources are less likely to rudely attempt to eaves drop than unknown sources might be. The reduction in output could also occur in other contexts, such as when input signals indicate a quiet place such as a theater, an office, etc.

This identification function can further be used to initialize the audio output sound pressure level 114 of the audio output device 217, in addition to being used by the adjustment engine 235 to make changes in response to changes occurring in the audio input 238, the distance 122, the direction 241, the ambient noise level 236, or other input factors. Illustrating by example, in one or more embodiments the electronic device 108 can scan the environment 116 about the electronic device 108 to determine whether the electronic device 108 is situated in a public, private, or semi-private setting. For example, the audio input device 213 can receive audio input 238 and/or additional audio input 242 from one or more sources 240,243,244. The one or more processors 206, from signals from the one or more sensors 215 and/or the audio input/processor 210, can determine whether the audio input was received from a single source, e.g., source 240, or from a plurality of sources, e.g., sources 240,243,244.

In one or more embodiments, when or where the audio input 238 and/or the additional audio input 242 is from a single source, e.g., source 240, the one or more processors 206 can conclude that the electronic device 108 is in an environment 116 that is private. Accordingly, the adjustment engine 235 can adjust the audio output sound pressure level 114 of the audio output device 217 to a first audio output sound pressure level 245.

In one or more embodiments, when or where the audio input 238 and/or the additional audio input 242 is from a single source, e.g., sources 240,243,244, the one or more processors 206 can conclude that the electronic device 108 is in an environment 116 that is either public or only semi-private. Accordingly, the adjustment engine 235 can adjust the audio output sound pressure level 114 of the audio output device 217 to a second audio output sound pressure level 246. In one or more embodiments, the second audio output sound pressure level 246 is less than the first audio output sound pressure level 245.

As noted above, the one or more processors 206 can attempt to identify each source 240,243,244. In this manner, the one or more processors 206 can determine whether the sources 240,243,244 are known sources, e.g., an authorized user of the electronic device 108 and one or more known acquaintances, or if some of the sources 243,244 are unknown individuals.

In one or more embodiments, when or where at least one source, e.g., source 244, of the plurality of sources 240,243, 244 is unidentified, the adjustment engine 235 can adjust the audio output sound pressure level 114 of the audio output device 217 to a third audio output sound pressure level 247 that is different from the second audio output sound pressure level 246. In one or more embodiments, the third audio output sound pressure level 247 is less than the second audio output sound pressure level 246.

Whether the persons are known or unknown can serve as an input to the adjustment engine 235 regarding whether to reduce the audio output sound pressure level 114 of the audio output device 217. For example, if the one or more processors 206 determine that the additional audio input 242 comprises voices from a plurality of sources 240,243,244, but that those voices are all identifiable by the one or more processors 206, the one or more processors 206 may conclude that the electronic device 108 is in a semi-private environment.

Thereafter, operations previously described can again occur, despite the fact that there is a plurality of sources 240,243,244 within the environment 116 of the electronic device 108. For instance, the one or more processors 206 can determine a received audio input sound pressure level 119 of the audio input 238 and/or the additional audio input 242 decreasing. When this occurs, the adjustment engine 235 can reduce the audio output sound pressure level 114 of the audio output device 217, and so forth.

Some of these operations, however, can be modified when there is a plurality of sources 240,243,244 within the environment 116 of the electronic device 108. With reference to the distance 122 determination, when there is a plurality of sources 240,243,244 within the environment 116 of the electronic device 108, the one or more processors can determine a distance 122 between a closest source, e.g., source 240, of the one or more sources 240,243,244 and the electronic device 108. Thereafter, the estimating engine 214 can estimate an acoustic attenuation level 251 of the audio input 238 and/or additional audio input 242 as a function of the distance 122, or alternatively as a function of one or more barriers between the user and the electronic device, such as when a shirt, sweater, or jacket is covering the electronic device or when the electronic device is in a pocket or purse. The adjustment engine 235 can then increase the audio output sound pressure level 114 of the audio output device 217 to compensate for the acoustic attenuation level 251. In one or more embodiments, the adjustment engine 235 increases the audio output sound pressure level 114 of the audio output device 217 by an amount equal to or less than the acoustic attenuation level 251.

Alternatively, where the one or more processors 206 and/or audio input/processor 210 is able to identify, from signals from the one or more sensors 215, one of the sources, e.g., source 240, as an authorized user of the electronic device 108, the distance-based adjustment can be modified.

For instance, the one or more processors can determine a distance 122 between the authorized user, e.g., source 240, and the electronic device 108. Once determined, the estimating engine 214 can determine that the distance 122 between the authorized user and the electronic device is decreasing. Where this occurs, in one or more embodiments the adjustment engine 235 can then decrease the audio output sound pressure level 114 of the audio output device 217, as previously described.

Figure 3:
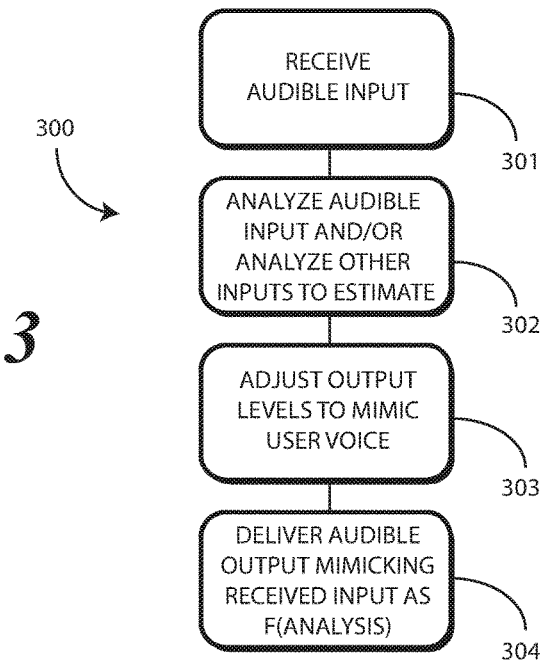
FIG. 3 illustrates one explanatory method in accordance with one or more embodiments of the disclosure.

Now that various hardware components have been described, attention will be turned to methods of using electronic devices in accordance with one or more embodiments of the disclosure. Turning now to FIG. 3, illustrated therein is one explanatory general method 300 for the electronic device (108) of FIGS. 1 and 2. More detailed methods will be described thereafter with reference to subsequent figures.

At step 301 the method 300 receives, with an audio input device, audio input from a source. In one or more embodiments, step 301 comprises the audio input device receiving the audio input from a source. In one or more embodiments, the audio input being received at step 301 is received at a received audio input sound pressure level.

In one or more embodiments, step 301 also comprises receiving and/or detecting other inputs from an environment of an electronic device. Many of these inputs have been described above with reference to FIGS. 1 and 2. Examples of such inputs include ambient noise from the environment about the electronic device, captured images or depth scans indicating whether only one person or multiple persons are within the environment of the electronic device, other information capable of being sensed by the various sensors of the electronic device as described above with reference to FIG. 2, and so forth.

At step 302, the method 300 analyzes the audio input and, optionally, various other inputs that were received at step 301. For example, the analysis occurring at step 302 can comprise estimating, with one or more processors operable with the audio input device, a sound pressure level of the audio input when emanating from the source. The analysis of step 302 can comprise determining, with one or more sensors, a received sound pressure level of the audio input. The analysis of step 302 can comprise estimating, with the one or more processors, an acoustic attenuation level of the audio input as a function of the distance received or determined at step 301.

The analysis of step 302 can comprise determining a distance between a source and the audio input device. The analysis of step 302 can comprise determining a direction from which the audio input was received. The analysis of step 302 can comprise determining whether one or multiple voices are in the received audio input. The analysis of step 302 can comprise determining ambient noise levels associated with the ambient noise detected at step 301 in one or more embodiments.

Where, for example, step 301 comprises capturing one or more images of the environment of the electronic device with an imager, step 302 can comprise determining whether a single person or a plurality of persons are within the environment of the electronic device from the one or more images. Where step 301 comprises an audio input device capturing audio input from the environment of the electronic device, step 302 can comprise determining whether the single person or the plurality of persons are within the environment of the electronic device from the audio input, and so forth. These and other analysis examples of step 302 will be described in more detail below with reference to FIG.

4. Still others will be obvious to those of ordinary skill in the art having the benefit of this disclosure.

At step 303, the method 300 adjusts an audio output sound pressure level of an audio output device to mimic the audio input. In one or more embodiments, step 303 comprises adjusting the audio output sound pressure level of the audio output device to mimic the sound pressure level of the audio input when emanating from the source. These and other adjustment examples of step 303 will be described in more detail below with reference to FIG. 4. Still others will be obvious to those of ordinary skill in the art having the benefit of this disclosure.

At step 304, the method 300 outputs, with the audio output device, audio output. In one or more embodiments, step 305 comprises outputting, with the audio output device, the audio output at the audio output sound pressure level in response to receiving the audio input from the source. In one or more embodiments, step 304 comprises causing the audio output device to deliver audio output in response to the audio input.

Figure 4:
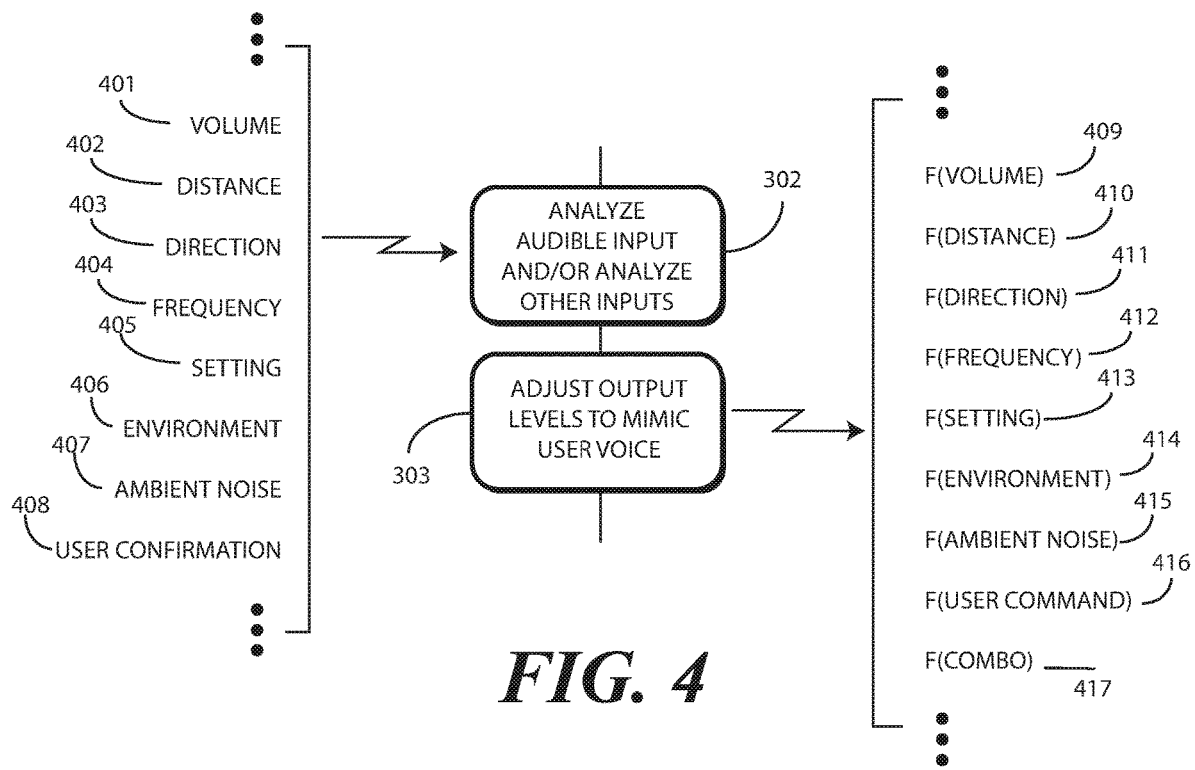
FIG. 4 illustrates one or more method steps, as well as one or more inputs and adjustment functions, in accordance with one or more embodiments of the disclosure.

Turning now to FIG. 4, illustrated therein are various ways step 302 and step 303 of the method (300) of FIG. 3 can occur. In one or more embodiments, the analysis of step 302 uses sound pressure level as an input. Illustrating by example, in one or more embodiments step 302 comprises determining, with one or more sensors, a received sound pressure level 401 of the audio input. In such an embodiment, step 302 can comprise estimating a sound pressure level of the audio input received at step (301) of the method (300) of FIG. 3, when that audio input was emanating from the source, as a function 409 of the received sound pressure level 401. The adjustment occurring at step 303 can then comprise adjusting the audio output sound pressure level of the audio output device to the received sound pressure level 401 in one or more embodiments.

In another embodiment, step 302 can comprise determining that the received sound pressure level is decreasing. In such an embodiment, step 303 can comprise reducing the audio output sound pressure level of the audio output device.

In one or more embodiments, the analysis of step 302 uses distance 402 as an input. Illustrating by example, in one or more embodiments step 302 comprises determining, with one or more sensors, a distance 402 between a source output of the source and the audio input device. In such an embodiment, step 302 can comprise estimating a sound pressure level of the audio input received at step (301) of the method (300) of FIG. 3, when that audio input was emanating from the source, as a function 410 of the distance 402. The adjustment occurring at step 303 can then comprise adjusting the audio output sound pressure level of the audio output device as the function 410 of the distance 402.

For instance, in one or more embodiments step 302 can comprise determining, with one or more sensors, the distance 402 between the source and the audio input device is decreasing. Thereafter, step 303 can comprise reducing the audio output sound pressure level of the audio output device.

In another embodiment step 302 can comprise determining, with the one or more sensors, a distance 402 between a source output of the source and the audio input device decreasing. Thereafter, step 303 can comprise reducing the audio output sound pressure level of the audio output device. Illustrating by example, step 302 can comprise determining a distance 402 between a mouth of the authorized user and the electronic device decreasing, while step 303 comprises reducing the audio output sound pressure level of the audio output device.

Figure 5:
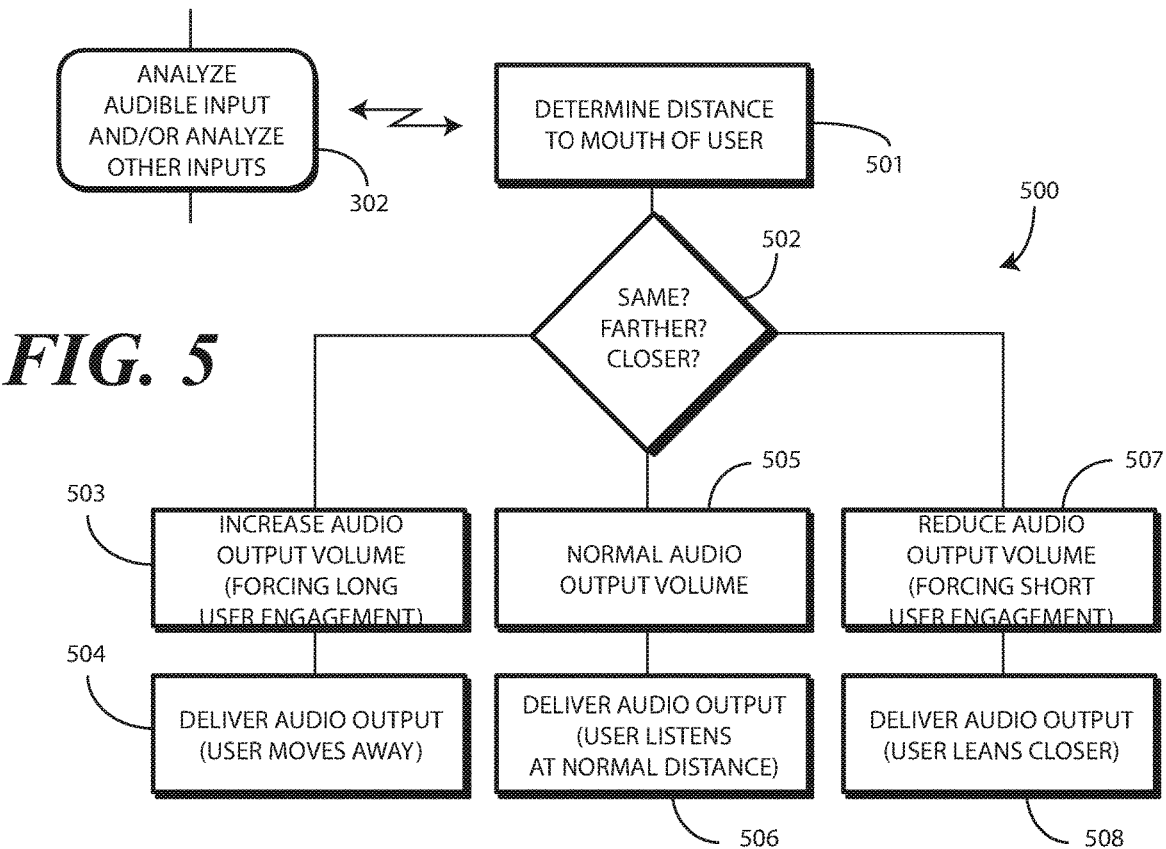
FIG. 5 illustrates one or more method steps in accordance with one or more embodiments of the disclosure.

Turning briefly to FIG. 5, illustrated therein is one explanatory method 500 by which step 303 can be performed in such an embodiment. Beginning at step 501, the method 500 determines the distance between the mouth of a user and the electronic device or audio input device of the electronic device. Decision 502 then determines whether this distance is increasing, decreasing, or remaining constant.

Where decision 502 determines the distance is increasing, the method 500 moves to step 503. In one or more embodiments, step 503 comprises increasing the audio output sound pressure level of the audio output device. Step 504 can then comprise outputting, with the audio output device, audio output at the audio output sound pressure level. In one or more embodiments, step 504 occurs in response to receiving the audio input from the source.

Where decision 502 determines the distance is remaining constant, the method 500 moves to step 505. In one or more embodiments, step 505 comprises maintaining the audio output sound pressure level of the audio output device. Step 506 can then comprise outputting, with the audio output device, audio output at the audio output sound pressure level. In one or more embodiments, step 506 occurs in response to receiving the audio input from the source.

Where decision 502 determines the distance is decreasing, the method 500 moves to step 507. In one or more embodiments, step 507 comprises decreasing the audio output sound pressure level of the audio output device. Step 508 can then comprise outputting, with the audio output device, audio output at the audio output sound pressure level. In one or more embodiments, step 504 occurs in response to receiving the audio input from the source.

Turning now back to FIG. 4, in another embodiment, step 302 can comprise determining, with the one or more sensors, a distance 402 between a source input of the source and the audio input device decreasing. Thereafter, step 303 can comprise reducing the audio output sound pressure level of the audio output device. Illustrating by example, step 302 can comprise determining a distance 402 between an ear of the authorized user and the electronic device decreasing, while step 303 comprises reducing the audio output sound pressure level of the audio output device.

Figure 6:
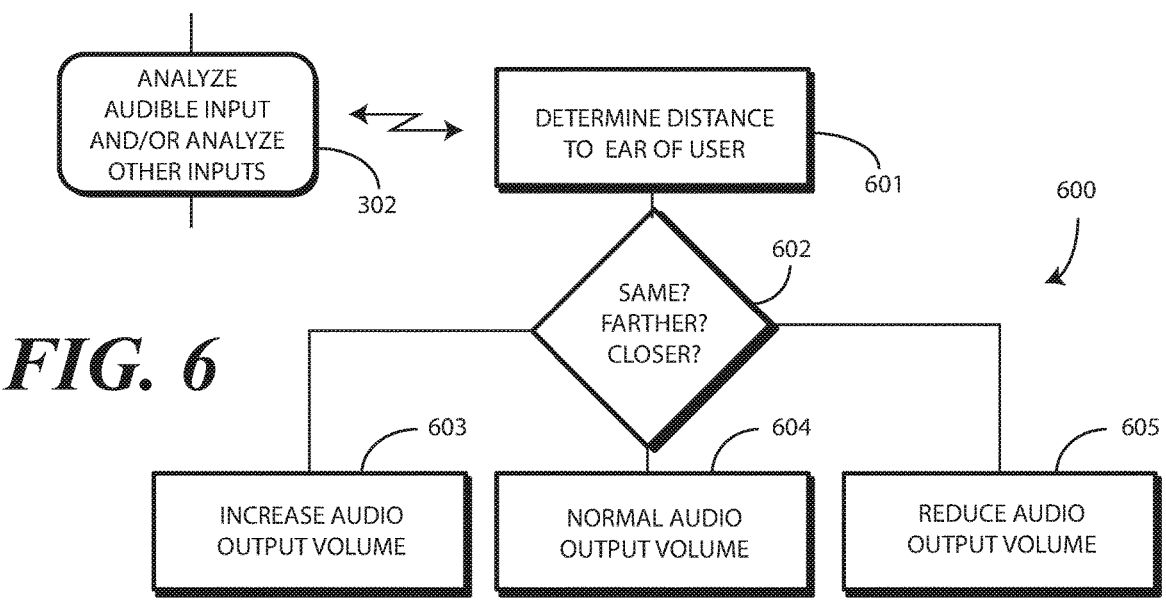
FIG. 6 illustrates one or more method steps in accordance with one or more embodiments of the disclosure.

Turning briefly to FIG. 6, illustrated therein is one explanatory method 600 by which step 303 can be performed in such an embodiment. Beginning at step 601, the method 600 determines the distance between the ear of a user and the electronic device or audio input device of the electronic device. Decision 602 then determines whether this distance is increasing, decreasing, or remaining constant.

Where decision 602 determines the distance is increasing, the method 600 moves to step 603. In one or more embodiments, step 603 comprises increasing the audio output sound pressure level of the audio output device.

Where decision 602 determines the distance is remaining constant, the method 600 moves to step 604. In one or more embodiments, step 604 comprises maintaining the audio output sound pressure level of the audio output device.

Where decision 602 determines the distance is decreasing, the method 600 moves to step 605. In one or more embodiments, step 605 comprises decreasing the audio output sound pressure level of the audio output device.

Turning now back to FIG. 4, in another embodiment step 302 can comprise determining a distance 402 between one or both of a source audio output or a source audio input and the electronic device is decreasing. Thereafter, step 303 can comprise decreasing the audio output sound pressure level of the audio output device.

In one or more embodiments, the analysis of step 302 uses direction 403 as an input. Illustrating by example, in one or more embodiments step 302 comprises determining, with one or more sensors, a direction 403 from which the audio input was received by the audio input device. In such an embodiment, step 302 can comprise estimating a sound pressure level of the audio input received at step (301) of the method (300) of FIG. 3, when that audio input was emanating from the source, as a function 411 of the direction 403. The adjustment occurring at step 303 can then comprise adjusting the audio output sound pressure level of the audio output device as the function 411 of the direction 403.

In one or more embodiments, the analysis of step 302 uses frequencies 404 associated with the audio input received at step (301) of the method (300) of FIG. 3 as an input. Illustrating by example, in one or more embodiments step 302 comprises determining, with one or more sensors, frequencies 404 associated with the audio input. For instance, if a person is talking normally there will be one spectrum of frequencies 404 associated with the audio input. By contrast, if a person is whispering or talking in low, creaky, dulcet tones to preserve privacy, there will be a different spectrum of frequencies 404 associated with the audio input.

In such an embodiment, step 302 can comprise estimating a sound pressure level of the audio input received at step (301) of the method (300) of FIG. 3, when that audio input was emanating from the source, as a function 412 of the frequencies 404 associated with the voice input. The adjustment occurring at step 303 can then comprise adjusting the audio output sound pressure level of the audio output device as the function 412 of the frequencies 404. Thus, if a person is speaking in a conversational tone, as evidenced by the frequencies 404, the adjustment occurring at step 303 may adjust the audio output sound pressure level of the audio output device to a first audio output sound pressure level. By contrast, if the person is whispering or talking in low, creaky, dulcet tones to preserve privacy, as evidenced by the frequencies 404, the adjustment occurring at step 303 may adjust the audio output sound pressure level of the audio output device to a second audio output sound pressure level that is lower than the first audio output sound pressure level, and so forth. Also, if a person is whispering, even "at normal level," or alternatively speaking very low base sounds, such audio frequencies, e.g., whispering, could be indicative of need for privacy.

In one or more embodiments, the analysis of step 302 uses setting 405 detected at step (301) of the method (300) of FIG. 3 as an input. Illustrating by example, in one or more embodiments step 302 comprises determining, from signals from one or more sensors, whether a single person or a plurality of persons are within an environment 406 or setting 405 of the electronic device. The adjustment occurring at step 303 can then comprise adjusting the audio output sound pressure level of the audio output device as the function 415 of the environment 406 or the function 414 of the setting 405, which can include the persons or audio input sources in the environment 406 or setting 405.

In one or more embodiments, where step (301) of the method (300) of FIG. 3 included an imager capturing one or more images of the environment or setting 405 of the electronic device, step 302 can comprise determining whether the single person or the plurality of persons are within the environment 406 or setting 405 of the electronic device from the one or more images. Said differently, where step (301) of the method (300) of FIG. 3 included an imager capturing one or more images of the environment 406 or setting 405 of the electronic device, step 302 can comprise identifying how many sources are represented in the one or more images. By contrast, where step (301) of the method (300) of FIG. 3 included an audio input device capturing audio input from the environment 406 or setting 405 of the electronic device, step 302 can comprise determining whether the single person or the plurality of persons are within the environment 406 or setting 405 of the electronic device from the audio input.

In one or more embodiments, where step 302 determined a plurality of persons are within the environment 406 or setting 405 of the electronic device, this step 302 can further include attempting to identify, from signals from the one or more sensors, each person of the plurality of persons. For instance, step 302 can comprise identifying, with the one or more sensors, an authorized user of the electronic device from the one or more sources. This can be done from audio input via voice recognition in one embodiment. Alternatively, this can be done from images via image recognition, from depth scans via depth scan recognition, or a combination thereof, as previously described.

Where step 302 comprises determining how many persons are within the environment 406 or setting 405 of the electronic device, step 303 can comprise initializing the audio output sound pressure level of the audio output device as the function 414 of the number of persons or audio input sources positioned within environment 406 or setting 405. Illustrating by example, in one or more embodiments step 303 comprises, where a single person is within the environment 406 of the electronic device, initializing an audio output sound pressure level of an audio output device at a first audio output sound pressure level.

By contrast, where a plurality of persons are within the environment 406 of the electronic device, step 303 can comprise initializing the audio output sound pressure level of the audio output device at a second audio output sound pressure level. In one or more embodiments, the second audio output sound pressure level is less than the first audio output sound pressure level.

Where step 302 comprises attempting to identify, from signals from the one or more sensors, each person of the plurality of persons positioned within environment 406 or setting 405 of the electronic device, step 303 can occur as a function of this identification. Illustrating by example, in one or more embodiments step 303 can comprise initializing the audio output device at a first predefined audio output sound pressure level prior to making any adjustments when step 302 identifies all sources positioned within environment 406 or setting 405 of the electronic device.

By contrast, step 303 can comprise initializing the audio output device at a second predefined audio output sound pressure level prior to making any adjustments when step 302 identifies only some sources positioned within environment 406 or setting 405 of the electronic device. In one or more embodiments, the second predefined audio output sound pressure level is less than the first predefined audio output sound pressure level.

In still another embodiment, step 303 can comprise initializing the audio output device at a third predefined audio output sound pressure level prior to making any adjustments when step 302 identifies fewer than all persons of the plurality of persons are identified. In one or more embodiments, the third audio output sound pressure level is less than the second audio output sound pressure level. In one or more embodiments, the third audio output sound pressure level is less than both the second audio output sound pressure level and the first audio output sound pressure level.

In one or more embodiments, the analysis of step 302 uses ambient noise level 407 associated with the audio input received at step (301) of the method (300) of FIG. 3 as an input. Illustrating by example, in one or more embodiments step 302 comprises determining, with one or more sensors, an ambient noise level 407 in an environment 406 about the electronic device. In such an embodiment, step 302 can comprise estimating a sound pressure level of the audio input received at step (301) of the method (300) of FIG. 3, when that audio input was emanating from the source, as a function 415 of the ambient noise level 407. The adjustment occurring at step 303 can then comprise adjusting the audio output sound pressure level of the audio output device as the function 415 of the ambient noise level 407.

Illustrating by example, in one or more embodiments step 302 can comprise determining, with one or more sensors, the ambient noise level is decreasing. Thereafter, step 303 can comprise reducing the audio output sound pressure level of the audio output device.

In one or more embodiments, the analysis of step 302 uses user commands 408 as an input. Illustrating by example, in one or more embodiments step 302 comprises determining, with one or more sensors, whether one or more user commands 408, which may override any sound pressure level setting, are received in the audio input. In such an embodiment, step 302 can comprise be omitted as a function 416 of the user commands 408. If, for example, the sound pressure level is reduced and the user says, "Normal volume, please," the adjustment occurring at step 303 can then comprise adjusting the audio output sound pressure level of the audio output device to a normal sound pressure level 401 as a function 416 of the user commands 408, and so forth. One example of this will be described in more detail below with reference to FIG. 9.

While the various inputs set forth in FIG. 4 can be used individually in step 302, with functions thereof used individually in step 303, embodiments of the disclosure are not so limited. In other embodiments, combinations of these inputs can be used in step 302, with step 303 occurring as a function 417 of these combined inputs.

Illustrating by example, in one or more embodiments step 302 can use both received sound pressure level 401 and distance 402 as inputs. For instance, step 302 can comprise determining a received sound pressure level of the audio input at the audio input device, as well as determining a distance between a source output of the source and the audio input device. Where this occurs, step 302 can comprise estimating an acoustic attenuation level of the audio input as a function of the distance, as described above with reference to FIGS. 1 and 2. Alternatively, or in combination, step 302 can additionally comprise estimating an acoustic attenuation level of the audio input as a function of one or more barriers between the user and the electronic device, such as when a shirt, sweater, or jacket is covering the electronic device or when the electronic device is in a pocket or purse, as previously described.

In one such an embodiment, step 303 can comprise adjusting the audio output sound pressure level of the audio output device to the received sound pressure level plus the acoustic attenuation level. In another embodiment, step 303 can comprise increasing the audio output sound pressure level by the acoustic attenuation level, and so forth.

In one or more other embodiments, step 302 can use both distance 402 and setting 405 or environment 406 as inputs.

For instance, step 302 can comprise identifying, with the one or more sensors, an authorized user of the electronic device from one or more sources found in the setting 405 or environment 406 of the electronic device, as well as determining a distance between the authorized user and the electronic device decreasing. Where this occurs, step 303 can comprise reducing the audio output sound pressure level of the audio output device.

In another embodiment, if multiple voices are emanating from same direction, e.g., when two people are speaking side-by-side to the wearable electronic device, this might be determined to be a private setting with need to attenuate. For example, if the second voice is a friend of the first voice, and those voices are determined to be received from side-by-side locations, this may indicate that no reduction in the audio output sound pressure level of the audio output device is required.

In one or more other embodiments, step 302 can use both distance 402 and direction 403 as inputs. For instance, step 302 can comprise determining, with one or more sensors, the distance 402 between the source and the audio input device decreasing, as well as determining, with the one or more sensors, the direction 403 from which the audio input was received changing. Thereafter, step 303 can comprise reducing the audio output sound pressure level of the audio output device. In one or more embodiments, this reduction occurs only where both the distance between the source and the audio input device decreases and the direction from which the audio input was received changes.

Figure 7:
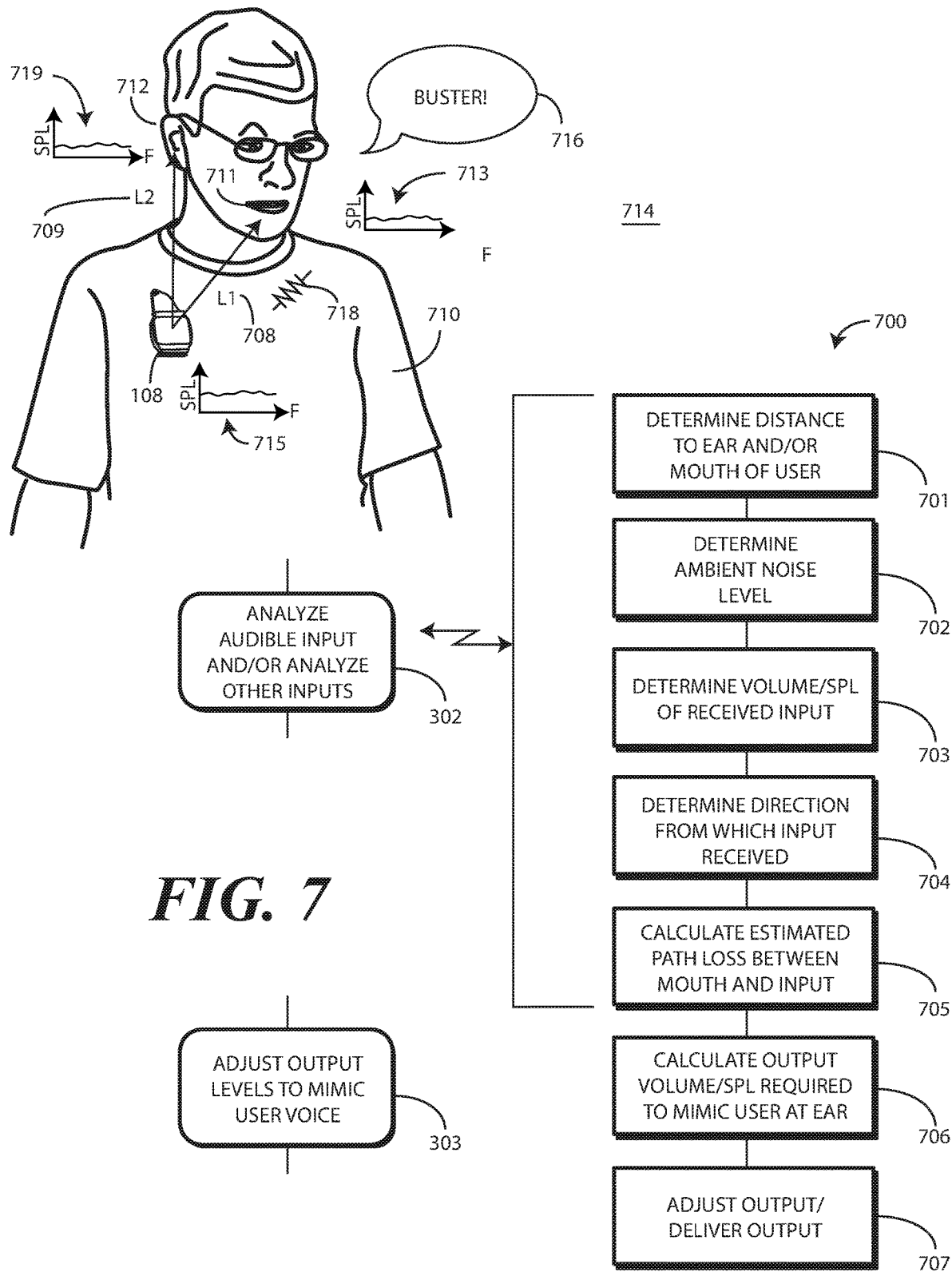
FIG. 7 illustrates one or more method steps in accordance with one or more embodiments of the disclosure.

Turning briefly to FIG. 7, illustrated therein is one explanatory method 700 illustrating how a plurality of inputs can be used at step 302 and 303 in combination. In the illustrative embodiment of FIG. 7, the plurality of inputs includes sound pressure level, distance, acoustic attenuation level from distance end environment inputs, ambient noise level, and direction. Others could be used as well.

Beginning at step 701, the method 700 determines a distance 708 between a mouth 711 of a user 710 and the electronic device 108. This can occur in a variety of ways. Illustrating by example, an imager can capture images of the user. Alternatively, a proximity sensor can determine a distance between the user 710 and the electronic device 108. Other techniques for determining the distance 708 between the mouth 711 of a user 710 and the electronic device 108 will be obvious to those of ordinary skill in the art having the benefit of this disclosure. In one or more embodiments, step 701 further comprises determining another distance 709 between the ear 712 of the user 710 and the electronic device 108.

At step 702, the method 700 determines an ambient noise level 713 in an environment 714 about the electronic device 108. At step 703, the method 700 determines a received sound pressure level 715 of the audio input 716 at the audio input device.

At step 704, the method 700 determines a direction 717 from which the audio input 716 was received. At step 705, the method calculates an acoustic attenuation level 718 as a function of the distance. In one or more embodiments, step 705 comprises calculating a first acoustic attenuation level as a function of the distance 708 between the electronic device 108 and the mouth 711 of the user 710, and calculating a second acoustic attenuation level as a function of the distance 709 between the electronic device 108 and the ear 712 of the user 710.

At step 706, these factors are combined with the goal of mimicking the received audio input sound pressure level 715 at the ear 712 of the user 710. Said differently, the electronic device 108, and more particularly an audio output device of the electronic device 108, is attempting to deliver an audio output with an audio output sound pressure level that results in a sound pressure level 719 reaching the ear 712 of the user 710 that is as close as possible to the received audio input sound pressure level 715.

Accordingly, the calculation occurring at step 706 considers the various inputs. Step 706 can comprise adding the first acoustic attenuation level as a function of the distance 708 between the electronic device 108 and the mouth 711 of the user 710 to the received audio input sound pressure level 715, and then subtracting the second acoustic attenuation level as a function of the distance 709 between the electronic device 108 and the ear 712 of the user 710. Where there is an ambient noise level 713 in an environment 714 about the electronic device 108 that is increasing or decreasing, the change in ambient noise level 713 can be added to this sum at step 706.

At step 707, the method 700 adjusts an audio output sound pressure level of an audio output device. In one or more embodiments, this adjustment occurring at step 707 is intended to mimic the sound pressure level of the audio input 716 when emanating from the source, here the mouth 711 of the user 710, by causing a sound pressure level 719 reaching the ear 712 of the user 710 to match the received audio input sound pressure level 715. Step 720 then outputs the audio output at the audio output sound pressure level determined at step 707. In one or more embodiments, step 720 occurs in response to receiving the audio input from the source.

Figure 8:
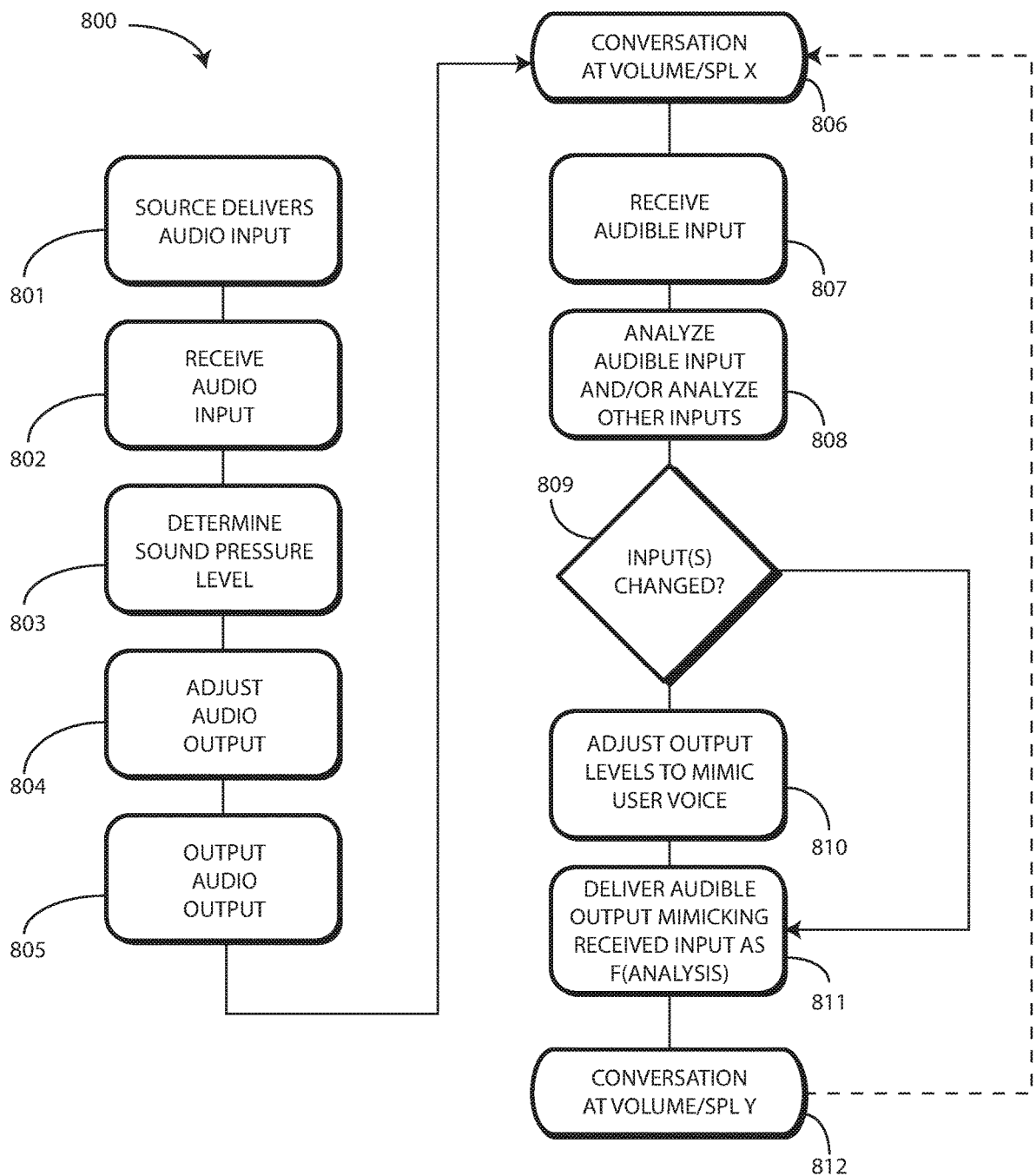
FIG. 8 illustrates one explanatory method in accordance with one or more embodiments of the disclosure.

Turning now to FIG. 8, illustrated therein is one explanatory method 800 illustrating how the adjustment processes described above can be performed iteratively, in real time, to mimic a sound pressure level of an audio input emanating from a source as that sound pressure level changes during a conversation. Beginning at step 801, a user, functioning as an audio input source, engages with an electronic device by delivering audible input to the electronic device at a first sound pressure level. At step 802, the electronic device receives first audio input from the source.

At step 803, one or more processors of the electronic device determined a first received sound pressure level of the audio input at the audio input device. At step 804, the one or more processors adjust an audio output sound pressure level of an audio output device to mimic the first sound pressure level of the audio input when emanating from the source. In one or more embodiments, this adjustment occurs as a function of the first received sound pressure level of the audio input at the audio input device.

For example, the one or more processors can set the audio output sound pressure level of the audio output device to the first received sound pressure level of the audio input at the audio input device, can set the audio output sound pressure level of the audio output device to the first received sound pressure level of the audio input at the audio input device plus an acoustic attenuation level that is a function of the distance between the source and the audio input device, or otherwise adjust the audio output sound pressure level of an audio output device to mimic the sound pressure level of the audio input when emanating from the source as described above.

At step 805, the audio output device can output a first audio output at a first audio output sound pressure level in response to receiving the first audio input from the source. Thus, steps 801-805 result in the electronic device mimicking the user at the first sound pressure level in the conversation, as shown at state 806.

Thereafter, perhaps if someone approaches and the user wants the conversation to remain private, at step 807, the audio input device receives a second audio input from the source. If the user moved their mouth closer to the electronic device and started whispering, which means the user is at a closer distance and is speaking with a lower volume, this second audio input would be at a lower volume, and perhaps at a different frequency spectrum than was the first audio input. There is lower volume alone, closer distance alone, and lower volume can imply together that the user is at a closer distance.

At step 808, the one or more processors determine a second sound pressure level of the second audio input at the audio input device. At decision 809, the one or more processors determine whether the second sound pressure level is substantially the same as the first sound pressure level, or alternatively whether the second sound pressure level differs from the first sound pressure level by at least a predefined threshold, such as one or two decibels.

Where the second sound pressure level differs from the first sound pressure level by at least a predefined threshold, the method 800 moves to step 810, where the one or more processors adjust the audio output sound pressure level of the audio output device to mimic the second sound pressure level of the audio input when emanating from the source. In one or more embodiments, this adjustment occurs as a function of the second received sound pressure level of the audio input at the audio input device. As with step 804, this adjustment can be made in a variety of ways, including any of the ways described above with reference to FIGS. 1-7.

When the second received sound pressure level is less than the first received sound pressure level by at least the predefined threshold, in one or more embodiments step 810 comprises reducing, with the one or more processors, the first audio output sound pressure level of the audio output device to a second audio output sound pressure level. When the second received sound pressure level is greater than the first received sound pressure level by at least the predefined threshold, in one or more embodiments step 810 comprises increasing, with the one or more processors, the first audio output sound pressure level of the audio output device to a second audio output sound pressure level.

The method 800 then moves to step 811. Where the second sound pressure is substantially the same as the first sound pressure level, e.g., where the second sound pressure level is less than the predefined threshold from the first sound pressure level, as determined by decision 809, the method also moves to step 811. At step 811, the audio output device outputs a second audio output at the second audio output sound pressure level in response to receiving the second audio input from the source. Thus, as shown at state 812, the electronic device mimics the user at the second sound pressure level in the conversation. This method 800 can repeat for as long as the user is conversing with the electronic device, thereby resulting in the electronic device continually, in real time, mimicking the user as the user's voice sound pressure level changes.

In one or more embodiments, the analysis occurring at steps 803 and 808 can include determining a distance between the source and the electronic device. Accordingly, in one or more embodiments step 803 comprises determining, with one or more sensors of the electronic device, a first distance between the source and the electronic device when the first audio input is received. Similarly, step 808 can comprise determining, with the one or more sensors, a second distance between the source and the electronic device when the second audio input is received.

The distance determinations can be used in a variety of ways. Illustrating by example, in one or more embodiments steps 804 and 810 can use the distance measurements when making adjustments. In one or more embodiments, these steps 804,810 can comprise determining an acoustic attenuation level as a function of the distance and increasing the audio output sound pressure level by the acoustic attenuation level. Alternatively, steps 804,810 can comprise employing an imager to estimate distance. In other embodiments, steps 804,810 can comprise using a depth imager to estimate distance. Still other methods for estimating distance will be obvious to those of ordinary skill in the art having the benefit of this disclosure.

Thus, in one or more embodiments step 804 comprises determining a first acoustic attenuation level as a function of the first distance, while step 810 comprises determining a second acoustic attenuation level as a function of the second distance. Where such attenuation levels are determined, they can be used as inputs for functions employed by the adjustment process. Accordingly, in one or more embodiments step 804 can comprise adjusting the first audio output sound pressure level to the first received sound pressure level plus the first acoustic attenuation level. Similarly, step 810 can comprise adjusting the second audio output sound pressure level to the second received sound pressure level plus the second acoustic attenuation level, and so forth.

In other embodiments, distance can be used as a gating condition. Illustrating by example, in one or more embodiments step 810 can comprise reducing the first audio output sound pressure level of the audio output device to the second audio output sound pressure level only where both the second received sound pressure level is less than the first received sound pressure level and the second distance is less than the first distance. This gating condition can be used for increasing sound pressure levels as well. Thus, in one or more embodiments step 810 can comprise increasing the first audio output sound pressure level of the audio output device to the second audio output sound pressure level only where both the second received sound pressure level is greater than the first received sound pressure level and the second distance is less greater the first distance. The need for privacy causes user to speak at lower volume. On the other hand, a sudden change to audio level could cause imager to turn on and assess scene for privacy/context capture.

Figure 9:
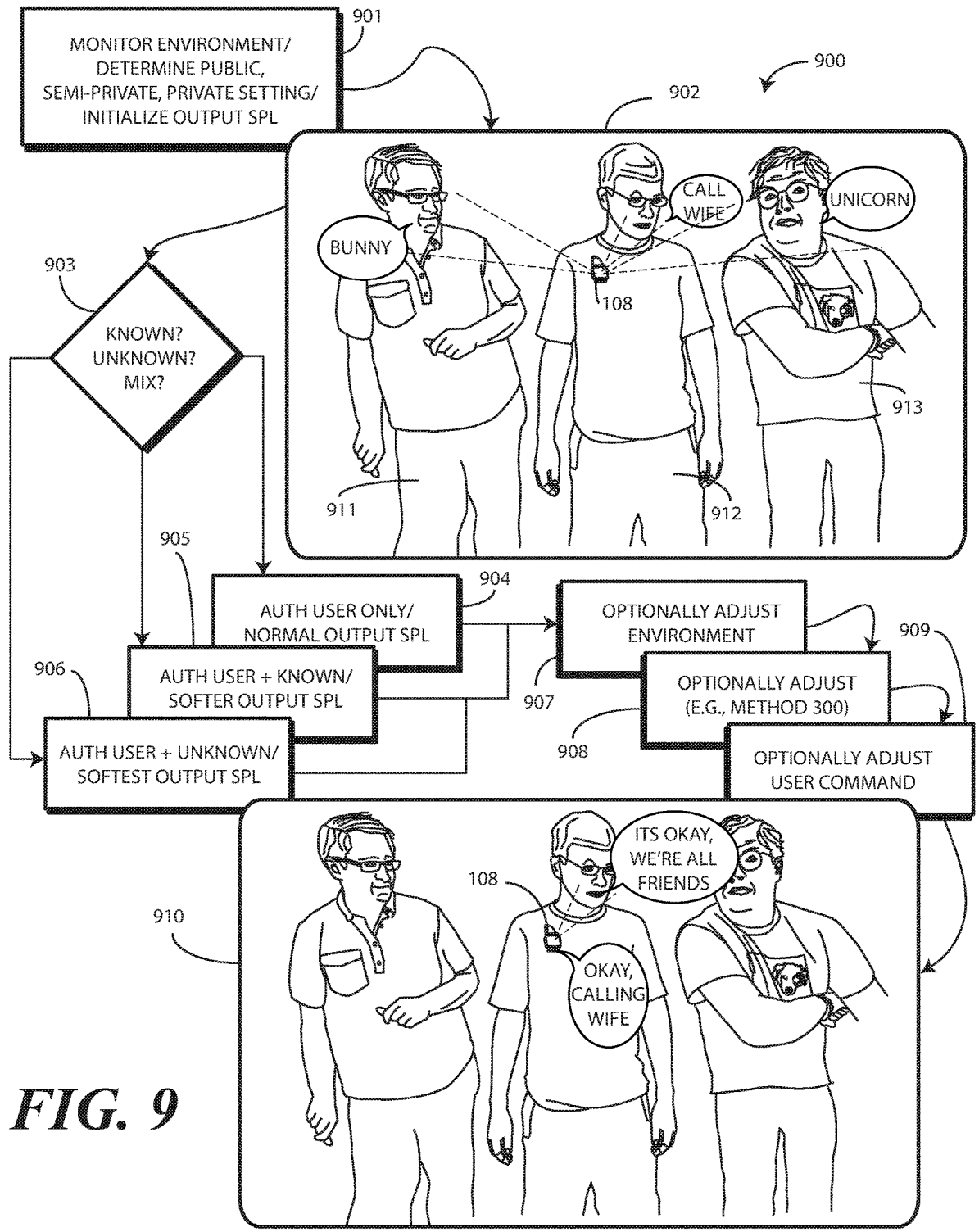
FIG. 9 illustrates one or more explanatory method steps associated with usage of an explanatory electronic device configured in accordance with one or more embodiments of the disclosure.

Recall from above that in addition to the real-time adjustments offered by the method 800 of FIG. 8, which transition audio output device sound pressure levels to mimic the user's voice, in one or more embodiments the electronic device can initialize itself to a starting audio output sound pressure level as well. Turning now to FIG. 9, illustrated therein is one such method 900 by which this can occur.

At step 901, an electronic device 108 monitors an environment 116 to determine the setting of that environment. This can occur in a variety of ways. In one or more embodiments, the monitoring of step 901 comprises capturing audio input from the environment 116 of the electronic device 108. In another embodiment, the monitoring of step 901 comprises capturing one or more images of the environment 116. In another embodiment, the monitoring of step 901 comprises using one or more proximity sensors to determine the number and placement of warm bodies within the environment 116. In still another embodiment, the monitoring of step 901 comprises capturing one or more depth scans of the environment 116. Of course, combinations of these techniques can be used as well. Still other techniques for monitoring the environment 116 will be obvious to those of ordinary skill in the art having the benefit of this disclosure.

At step 902, one example of this monitoring is illustrated. As shown, an audio input device of the electronic device 108 is receiving audio input from one or more sources 911,912, 913. In this illustrative embodiment, source 912 is an authorized user of the electronic device 108, while sources 911,913 are not authorized users.

In one or more embodiments, decision 903 comprises the one or more processors of the electronic device 108 determining, in response to signals from one or more sensors of the electronic device 108, e.g., imagers, depth imagers, proximity sensors, audio input devices, or any of the other sensors described above with reference to FIG. 2, whether one source or a plurality of sources are within the environment 116 of the electronic device 108. This can occur in a variety of ways.

In one or more embodiments, decision 903 comprises one or more processors of the electronic device determining whether the single person or the plurality of persons are within the environment of the electronic device from one or more images captured by an imager. In the illustrative embodiment of FIG. 9, step 902 included an audio input device capturing audio input from the environment 116 of the electronic device 108. Decision 903 then comprises the one or more processors determining whether the single person or the plurality of persons is within the environment of the electronic device from the audio input. Thus, in this illustrative example decision 903 comprises determining whether the audio input was received from a single source, e.g., source 912, or a plurality of sources, e.g., sources 911,912,913. Said more generally, in this example decision 903 comprises the one or more processors determining, from signals from the one or more sensors, whether a single person or a plurality of persons are within an environment 116 of the electronic device 108. Of course combinations of these techniques could be used as well. Moreover, still other techniques for determining whether one or multiple persons are within the environment 116 of the electronic device 108 will be obvious to those of ordinary skill in the art having the benefit of this disclosure.

Where only source 912 is delivering audio input, rather than a plurality of sources 911,912,913, the method 900 moves from decision 903 to step 904. Said differently, decision 903 would move to step 904 where only a single person was within the environment 116 of the electronic device 108, or where the audio input received at step 902 was received from only a single person. In one or more embodiments, where the audio input is received from the single source 912, step 904 can comprise adjusting, with one or more processors, an audio output sound pressure level of the audio output device of the electronic device 108 to a first audio output sound pressure level. If a multi-person presence context is determined, but speech recognition among the multiple persons indicates they are friends or family, a private context voice communication may not be triggered. Accordingly, detecting lower voice level may not be required.

In the illustrative embodiment of FIG. 9, however, the audio input received at step 902 comes from each of the sources 911,912,913. Source 912 is delivering a user command in the form of audio input by saying, "call wife." Sources 911,913 are debating which animal would be better as a superhero, with source 911 arguing for bunnies, while source 913 is arguing for unicorns. Since the user command from source 912 is being delivered during this discussion, the audio input received by the audio input device of the electronic device 108 comprises sounds from all three sources 911,912,913. Since the audio input being received at step 902 is from multiple sources, in one or more embodiments decision 903 attempts to identify, with one or more processors of the electronic device 108 and from signals from the one or more sensors, each source of the plurality of sources 911,912,913.

In one or more embodiments, where or when the audio input is received from the plurality of sources 911,912,913, and each source of the plurality of sources is identified at decision 903, the method moves to step 905. In one or more embodiments, step 905 comprises adjusting, with the one or more processors, the audio output sound pressure level of the audio output device to a second audio output sound pressure level. In one or more embodiments, the second audio output sound pressure is less than the first audio output sound pressure level. This lower sound pressure level is warranted because while the authorized user, source 912, is not in a private setting, everyone around the authorized user is known. Thus, they may be either privy to the discussion between the authorized user and the electronic device 108, or alternatively unlikely to eaves drop.

By contrast, where or when the audio input is received from the plurality of sources, and fewer than all sources of the plurality of sources is identified at decision 903, the method 900 moves to step 906. In one or more embodiments, step 906 comprises adjusting, with the one or more processors, the audio output sound pressure level of the audio output device to a third audio output sound pressure level. In one or more embodiments, the third audio output sound pressure level is less than the second audio output sound pressure level. Since there are unknown persons within the environment 116 of the electronic device 108, the one or more processors reduce the audio output device sound pressure level to a lower level to keep the conversation between the authorized user and the electronic device 108 as private as possible.

Once the initialization has occurred at one of step 904, step 905, or step 906, the method 900 moves to step 907, where additional adjustments to the audio output sound pressure level can be made in response to environmental conditions. Illustrating by example, in one or more embodiments step 907 comprises determining a distance between a closest source 912 of the one or more sources 911,912,913 and the electronic device 108, estimating, with the one or more processors, an acoustic attenuation level of the audio input as a function of the distance, and increasing, with the one or more processors, the audio output sound pressure level of the audio output device by an amount equal to or less than the acoustic attenuation level. In another embodiment, step 907 can comprise identifying, with the one or more sensors, an authorized user of the electronic device 108 from the one or more sources 911,912,913, determining, with the one or more sensors, a distance between the authorized user and the electronic device 108 decreasing, and reducing, with the one or more processors, the audio output sound pressure level of the audio output device. In still another embodiment, step 907 can comprise determining, with the one or more sensors, an ambient noise level in the environment 116 about the electronic device 108 and adjusting the audio output sound pressure level of the audio output device as a function of the ambient noise level to compensate for the background noise within the room. Step 908 can include making any adjustments described above with reference to the method (400) of FIG. 4.

In this illustrative example, sources 911,913 cannot be identified. Accordingly, decision 903 moves to step 906, where step 906 adjusts, with the one or more processors, the audio output sound pressure level of the audio output device to a third audio output sound pressure level. However, despite being unidentified, it turns out that sources 911,913 are friends of source 912. Accordingly, the method 900 of FIG. 9 includes another step 909 in which a user can deliver a voice command to override the initialization occurring at step 906. It should be noted that while step 909 is included illustratively in the method 900 of FIG. 9, it could be employed in any of the previously described methods, including the method (300) of FIG. 3, the method (800) of FIG. 8, or other methods.

In one or more embodiments, step 909 allows an authorized user, here source 912, to deliver a voice command to override any initialization or alteration of the audio output sound pressure level of the audio output device that was performed automatically. Thus voice command might be a special code word, such as "marshmallow," "sweet kimchi," or "tommy bahama" in one or more embodiments. (These code words are examples only, as numerous others will be obvious to those of ordinary skill in the art having the benefit of this disclosure.) Alternatively, the voice command can simply be a command.

Illustrating by example, at step 910 the authorized user delivers a voice command stating, "It's Okay! We're all friends!" Upon receiving this voice command, the electronic device 108 adjusts, with one or more processors, the audio output sound pressure level of the audio output device of the electronic device 108 back to the first audio output sound pressure level, as shown at step 910. In this illustration, the electronic device 108 responds, "Okay, calling wife" at the first audio output sound pressure level.

Figure 10:
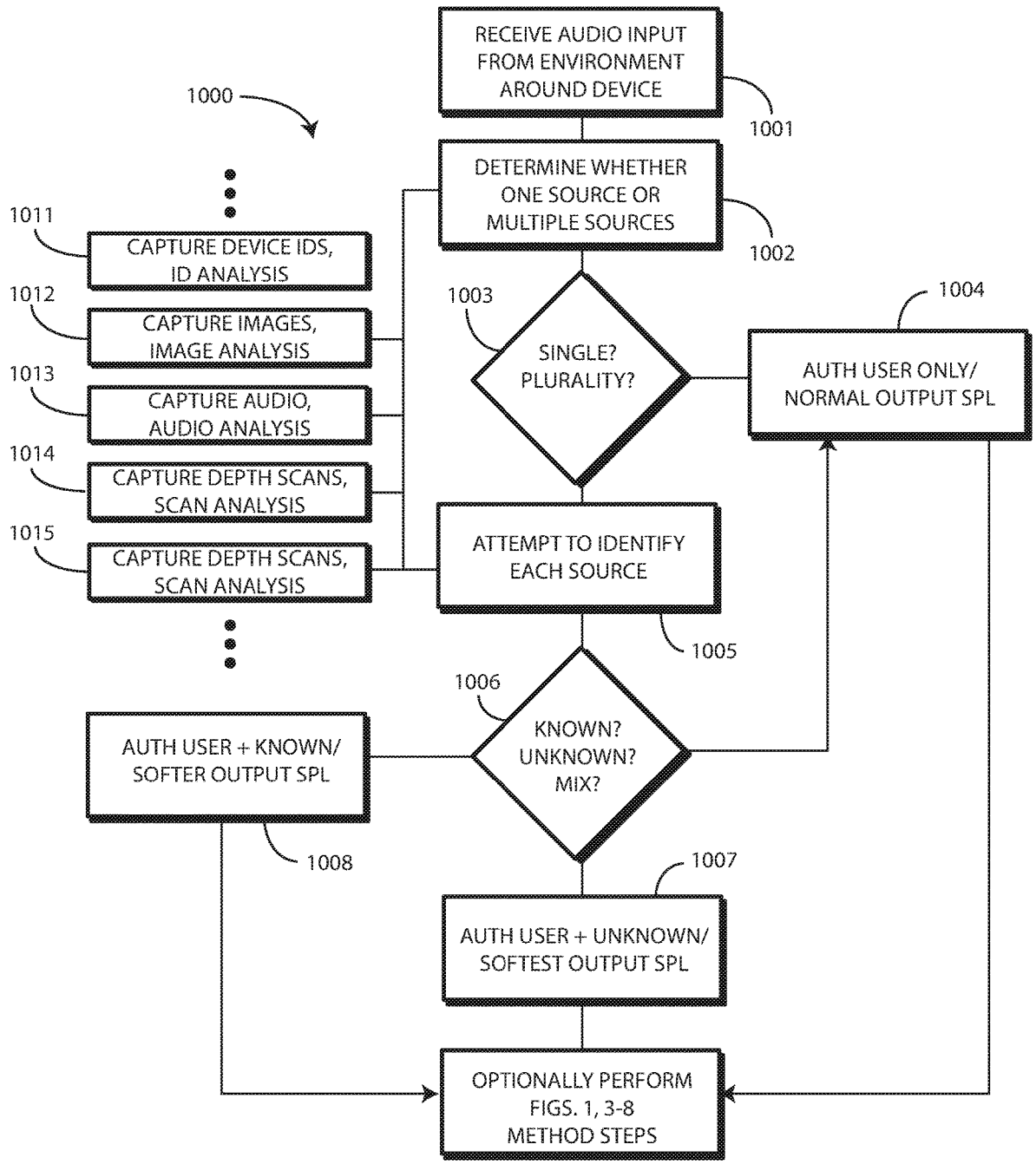
FIG. 10 illustrates yet another explanatory method in accordance with one or more embodiments of the disclosure.

Turning now to FIG. 10, illustrated therein is a generalized method 1000 for initializing an electronic device in accordance with one or more embodiments of the disclosure. Beginning at step 1001, the method 1000 receives, with an audio input device, an audio input from one or more sources. At step 1002, the method 1000 determines, with one or more sensors operable with one or more processors, whether the audio input was received from a single source or a plurality of sources. Said differently, in one or more embodiments step 1002 comprises determining, from signals from the one or more sensors, whether a single person or a plurality of persons is within an environment of the electronic device.

This can occur in a variety of ways. For instance, step 1010 comprises recognizing one or more electronic devices belonging to the sources to determine if they can be identified. If, for example, each source has a smartphone or wearable device such as a smart watch, step 1010 can comprise attempting to detect and/or identify these devices to determine whether a single person or a plurality of persons is within an environment of the electronic device.

Step 1011 comprises capturing, with an imager, one or more images of an environment of the electronic device and identifying how many sources are represented in the one or more images. Step 1012 comprises determining whether the single person or the plurality of persons is within the environment of the electronic device from the audio input received at step 1001. Step 1013 comprises capturing, with an imager, one or more depth scans of an environment of the electronic device and identifying how many sources are represented in the one or more depth scans. Step 1014 comprises detecting, with one or more proximity sensors, how many sources are represented in the one or more images. Other methods for determining whether a single person or a plurality of persons is within an environment of the electronic device will be obvious to those of ordinary skill in the art having the benefit of this disclosure.

Decision 1003 decides whether a single person or a plurality of persons is within an environment of the electronic device. Where the audio input is received from the single source, the method 1000 moves to step 1004. Said differently, where the single person is within the environment of the electronic device, the method 1000 moves to step 1004. At step 1004, in one or more embodiments the method 1000 initializes an audio output sound pressure level of an audio output device at a first audio output sound pressure level. After this initialization occurs, in one or more embodiments step 1004 comprises adjusting, with one or more processors, the audio output sound pressure level of the audio output device to a first audio output sound pressure level.

Where the audio input is received from the plurality of sources, in one or more embodiments step 1005 comprises initializing the audio output sound pressure level of the audio output device at a second audio output sound pressure level that is less than the first audio output sound pressure level. After this initialization occurs, in one or more embodiments step 1005 comprises adjusting, with the one or more processors, the audio output sound pressure level of the audio output device to a second audio output sound pressure level that is less than the first audio output sound pressure level of step 1004.

Decision 1006 optionally attempts to identify, with the one or more processors from signals from the one or more sensors, each source of the plurality of sources. Where at least one source of the plurality of sources is unidentified, step 1007 comprises adjusting, with the one or more processors, the audio output sound pressure level of the audio output device to a third audio output sound pressure level that is different from the second audio output sound pressure level. By contrast, when all sources are known, step 1008 comprises adjusting the audio output sound pressure level of the audio output device to a second audio output sound pressure level.

Figure 11:
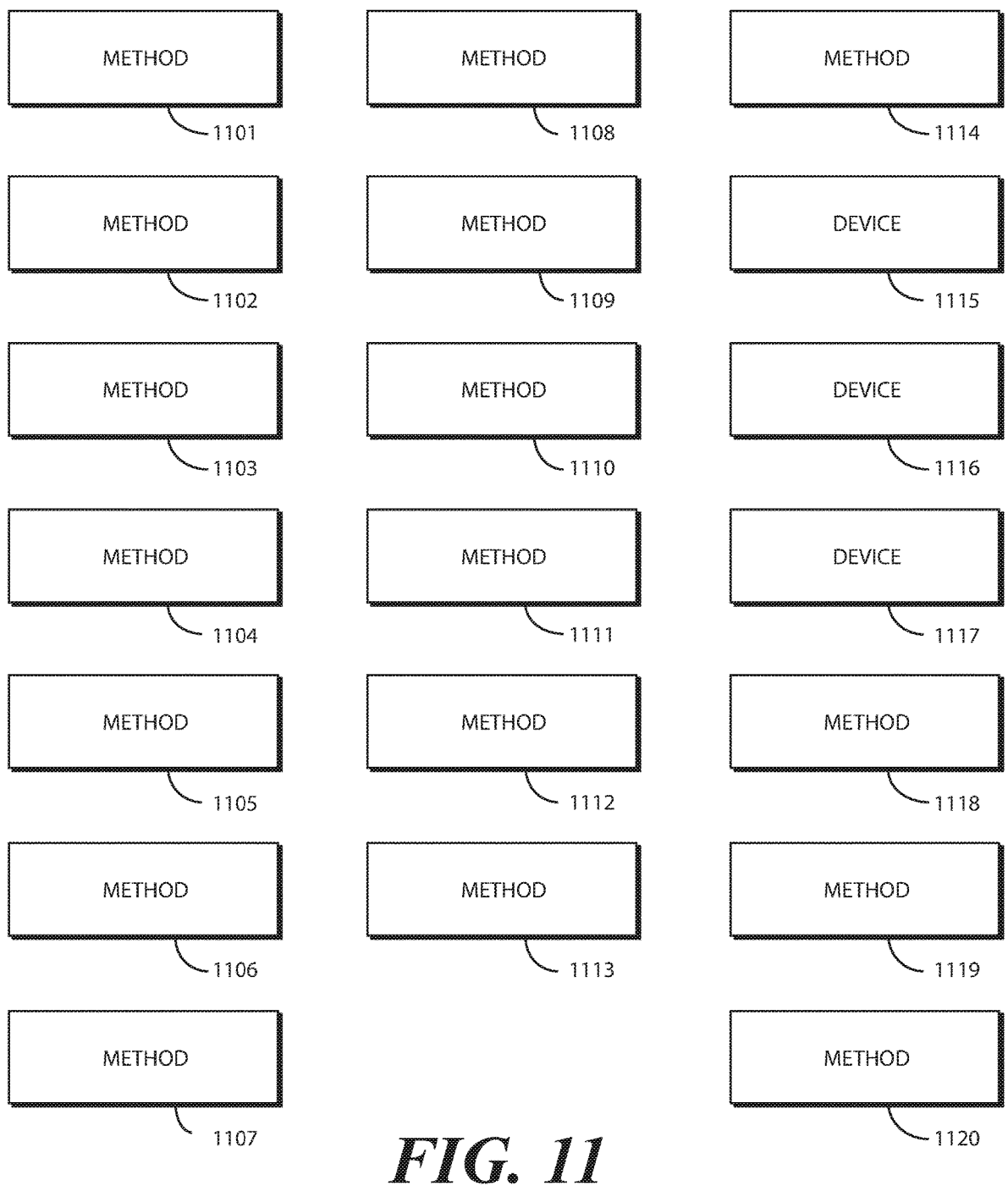
FIG. 11 illustrates one or more embodiments of the disclosure.

Turning now to FIG. 11, illustrated therein are one or more embodiments of the disclosure. At 1101, a method in an electronic device comprises receiving, with an audio input device, audio input from a source. At 1101, the method comprises estimating, with one or more processors operable with the audio input device, a sound pressure level of the audio input when emanating from the source.

At 1101, the method comprises adjusting, with the one or more processors, an audio output sound pressure level of an audio output device to mimic the sound pressure level of the audio input when emanating from the source. At 1101, the method comprises outputting, with the audio output device, audio output at the audio output sound pressure level in response to receiving the audio input from the source.

At 1102, the method of 1101 further comprises determining, with one or more sensors, a received sound pressure level of the audio input. At 1102, the estimating of 1101 occurs as a function of the received sound pressure level. At 1103, the adjusting of 1102 comprises adjusting the audio output sound pressure level of the audio output device to the received sound pressure level.

At 1104, the method of 1102 further comprises determining, with the one or more sensors, the received sound pressure level decreasing. At 1104, the method of 1102 further comprises reducing, with the one or more processors, the audio output sound pressure level of the audio output device.

At 1105, the method of 1101 further comprises determining, with one or more sensors, a distance between a source output of the source and the audio input device. At 1105, the estimating of 1101 occurs as a function of the distance.

At 1106, the method of 1105 further comprises determining, with one or more sensors, the distance between the source and the audio input device decreasing. At 1106, the method of 1105 comprises reducing, with the one or more processors, the audio output sound pressure level of the audio output device.

At 1107, the estimating of 1105 further comprises determining, with the one or more processors, a received sound pressure level of the audio input at the audio input device. At 1107, the estimating of 1105 further comprises estimating, with the one or more processors, an acoustic attenuation level of the audio input as a function of the distance. At 1106, the adjusting of 1105 comprises adjusting the audio output sound pressure level of the audio output device to the received sound pressure level plus the acoustic attenuation level.

At 1108, the method of 1105 further comprises determining, with the one or more sensors, another distance between a source input of the source and the audio input device decreasing. At 1108, the method of 1105 further comprises reducing, with the one or more processors, the audio output sound pressure level of the audio output device.

At 1109, the method of 1105 further comprises determining, with the one or more sensors, an ambient noise level in an environment about the electronic device. At 1109, the estimating of 1105 further occurs as a function of the ambient noise level.

At 1110, the method of 1109 further comprises determining, with one or more sensors, the ambient noise level decreasing. At 1110, the method of 1109 further comprises reducing, with the one or more processors, the audio output sound pressure level of the audio output device.

At 1111, the method of 1105 further comprises determining, with the one or more sensors, a direction from which the audio input was received by the audio input device. At 1111, the estimating of 1105 further occurs as a function of the direction.

At 1112, the method of 1111 further comprises determining, with one or more sensors, the distance between the source and the audio input device decreasing. At 1112, the method of 1111 further comprises determining, with the one or more sensors, the direction from which the audio input was received is changing. At 1112, the method of 1111 further comprises reducing, with the one or more processors, the audio output sound pressure level of the audio output device only where both the distance between the source and the audio input device decreases and the direction from which the audio input was received changes.

At 1113, the method of 1101 further comprises receiving, with the audio input device, additional audio input from one or more additional sources. At 1113, the method of 1101 further comprises attempting to identify, with the one or more processors from the additional audio input, each additional source of the one or more additional sources.

At 1114 the one or more processors of 1113 initialize the audio output device at a first predefined audio output sound pressure level prior to the adjusting when the one or more processors identify all additional sources of the one or more additional sources. At 1114 the one or more processors of 1113 initialize the audio output device at a second predefined audio output sound pressure level prior to the adjusting when the one or more processors identify only some additional sources of the one or more additional sources.

At 1115, an electronic device comprises an audio input device receiving an audio input, from a source. At 1115, the audio input is received at a received audio input sound pressure level. At 1115, the electronic device comprises an audio output device.

At 1115, the electronic device comprises one or more processors operable with the audio input device and the audio output device. At 1115, the one or more processors estimate an emanating audio input sound pressure level when the audio input emanated from the source. At 1115, the one or more processors adjust an audio output sound pressure level of the audio output device to mimic the emanating audio input sound pressure level. At 1115, the one or more processors cause the audio output device to deliver audio output in response to the audio input.

At 1116, the electronic device of 1115 further comprises one or more sensors determining a distance between one or both of a source audio output or a source audio input and the electronic device decreasing. At 1116, the one or more processors decrease the audio output sound pressure level of the audio output device.

At 1117, the electronic device of 1115 further comprises one or more sensors determining a distance between the source and the electronic device. At 1117, the one or more processors estimate the emanating audio input sound pressure level by determining an acoustic attenuation level as a function of the distance and adjusting comprises increasing the audio output sound pressure level by the acoustic attenuation level.

At 1118, a method in an electronic device comprises receiving, with an audio input device, a first audio input from a source. At 1118, the method comprises determining, with one or more processors, a first received sound pressure level of the first audio input at the audio input device. At 1118, the method comprises outputting, with an audio output device, a first audio output at a first audio output sound pressure level in response to receiving the first audio input from the source. In one or more embodiments, 1118 comprises recognizing a frequency shift. Such a frequency shift can occur when a person is whispering, even when that whispering occurs at the same sound pressure level. Where this occurs, the same could be indicative of a need for privacy and, accordingly, a reduction in audio output sound pressure level.

Thereafter, the method of 1118 comprises receiving, with the audio input device, a second audio input from the source. At 1118, the method comprises determining, with the one or more processors, a second received sound pressure level of the second audio input at the audio input device.

When the second received sound pressure level is less than the first received sound pressure level, the method of 1118 comprises reducing, with the one or more processors, the first audio output sound pressure level of the audio output device to a second audio output sound pressure level. When the second received sound pressure level is less than the first received sound pressure level, the method of 1118 comprises outputting, with the audio output device, a second audio output at the second audio output sound pressure level in response to receiving the second audio input from the source.

At 1119, the method of 1118 further comprises determining, with one or more sensors, a first distance between the source and the electronic device when the first audio input is received. At 1119, the method of 1118 further comprises determining, with the one or more sensors, a second distance between the source and the electronic device when the second audio input is received. At 1118, the reducing of 1118 occurs only where both the second received sound pressure level is less than the first received sound pressure level and the second distance is less than the first distance.

At 1120, the method of 1119 further comprises determining a first acoustic attenuation level as a function of the first distance and a second acoustic attenuation level as a function of the second distance. At 1120, the first audio output sound pressure level of 1119 comprises the first received sound pressure level plus the first acoustic attenuation level. At 1120, the second audio output sound pressure level of 1119 comprises the second received sound pressure level plus the second acoustic attenuation level.

Figure 12:
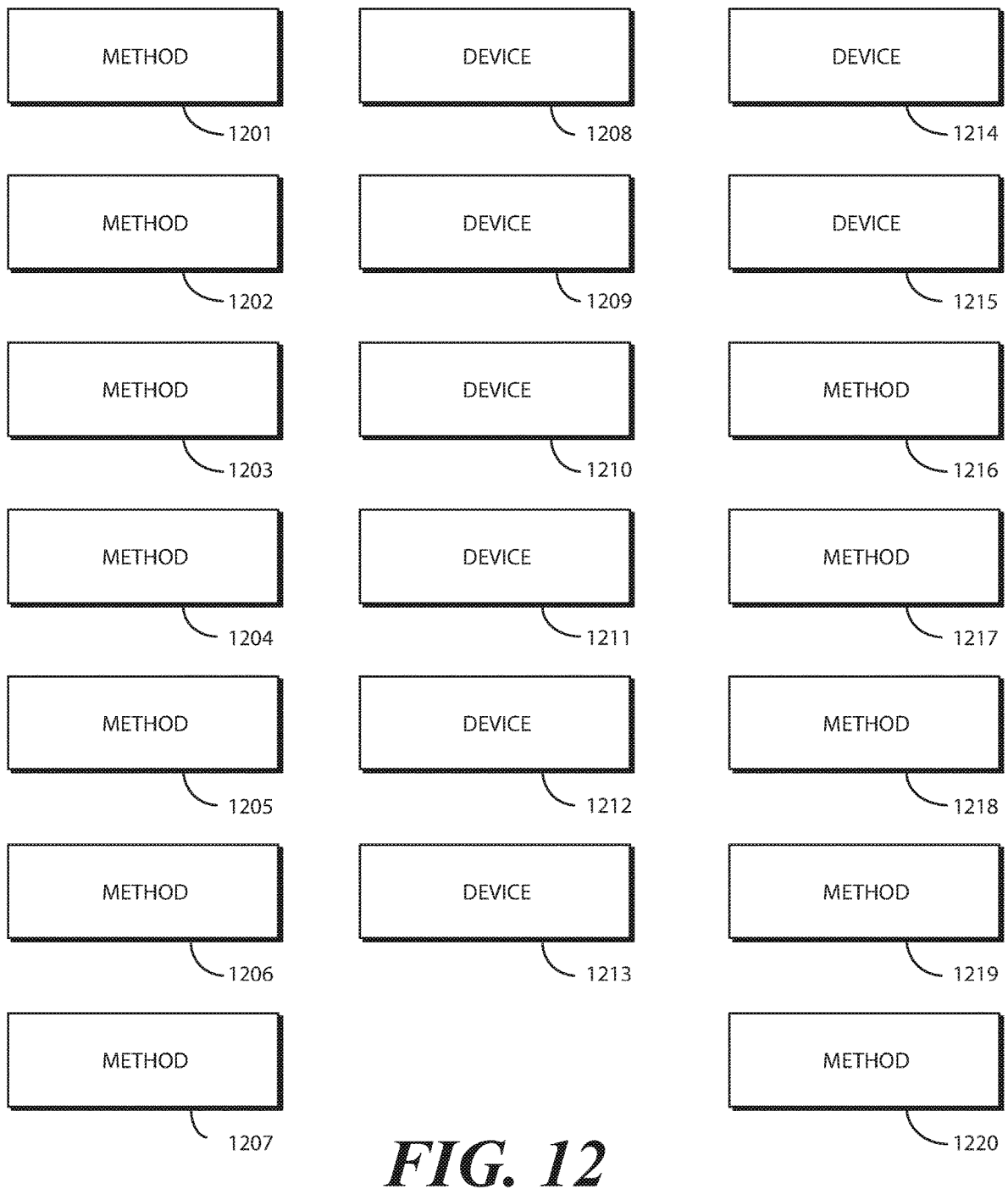
FIG. 12 illustrates one or more embodiments of the disclosure.

Turning now to FIG. 12, illustrated therein are one or more embodiments of the disclosure. At 1201, a method in an electronic device comprises receiving, with an audio input device, an audio input from one or more sources. At 1201, the method comprises determining, with one or more sensors operable with one or more processors, whether the audio input was received from a single source or a plurality of sources.

Where the audio input is received from the single source, the method of 1201 comprises adjusting, with one or more processors, an audio output sound pressure level of an audio output device to a first audio output sound pressure level. However, where the audio input is received from the plurality of sources, the method of 1201 comprises adjusting, with the one or more processors, the audio output sound pressure level of the audio output device to a second audio output sound pressure level that is less than the first audio output sound pressure level. In situations where the sources can be identified, as noted above, such as when automatic speech recognition indicates that the plurality of sources are all known, the adjustment of the audio output sound pressure level of the audio output device to the second audio output sound pressure level may not be required.

At 1202, the method of 1201 further comprises, where the audio input is received from the plurality of sources, attempting to identify, with the one or more processors from signals from the one or more sensors, each source of the plurality of sources. Where at least one source of the plurality of sources is unidentified, 1201 comprises adjusting, with the one or more processors, the audio output sound pressure level of the audio output device to a third audio output sound pressure level that is different from the second audio output sound pressure level.

At 1203, the method of 1202 further comprises determining, with the one or more processors, a received audio input sound pressure level of the audio input decreasing. At 1203, the method of 1202 further comprises reducing, with the one or more processors, the audio output sound pressure level of the audio output device.

At 1204, the method of 1202 further comprises determining, with the one or more processors, a received audio input sound pressure level of the audio input increasing. At 1204, the method of 1202 further comprises increasing, with the one or more processors, the audio output sound pressure level of the audio output device.

At 1205, the method of 1202 further comprises determining, with the one or more sensors, a distance between the one or more sources and the electronic device decreasing. At 1205, the method of 1202 further comprises reducing, with the one or more processors, the audio output sound pressure level of the audio output device.

At 1206, the method of 1202 further comprises determining a distance between a closest source of the one or more sources and the electronic device. At 1206, the method of 1202 further comprises estimating, with the one or more processors, an acoustic attenuation level of the audio input as a function of the distance. At 1206, the method of 1202 further comprises increasing, with the one or more processors, the audio output sound pressure level of the audio output device by an amount equal to or less than the acoustic attenuation level.

At 1207, the method of 1202 further comprises identifying, with the one or more sensors, an authorized user of the electronic device from the one or more sources. At 1207, the method of 1202 further comprises determining, with the one or more sensors, a distance between the authorized user and the electronic device decreasing. At 1207, the method of 1202 further comprises reducing, with the one or more processors, the audio output sound pressure level of the audio output device.

At 1208, an electronic device comprises one or more sensors. At 1208, the electronic device comprises an audio output device. At 1208, the electronic device comprises one or more processors operable with the one or more sensors and the audio output device.

At 1208, the one or more processors determine, from signals from the one or more sensors, determining, whether a single person or a plurality of persons are within an environment of the electronic device. Where the single person is within the environment of the electronic device, the one or more processors of 1208 initialize an audio output sound pressure level of an audio output device at a first audio output sound pressure level. However, where the plurality of persons are within the environment, which can be within a predefined distance of the electronic device, such as ten feet, fifteen feet, or twenty feet of the electronic device, the one or more processors of 1208 initialize the audio output sound pressure level of the audio output device at a second audio output sound pressure level that is less than the first audio output sound pressure level.

At 1209, the one or more sensors of 1028 comprise an imager capturing one or more images of the environment of the electronic device. At 1209, the one or more processors of 1208 determine whether the single person or the plurality of persons is within the environment of the electronic device from the one or more images.

At 1209, the one or more sensors of 1028 comprise an audio input device capturing audio input from the environment of the electronic device. At 1209, the one or more processors of 1208 determine whether the single person or the plurality of persons is within the environment of the electronic device from the audio input.

At 1211, the one or more processors of 1208 determine, from the signals from the one or more sensors, a distance between the single person or a plurality of persons decreasing. At 1211, the one or more processors of 1208 reduce, the audio output sound pressure level of the audio output device.

At 1212, the one or more processors of 1211 estimate an acoustic attenuation level of the audio input as a function of the distance. At 1212, the one or more processors of 1211 increase the audio output sound pressure level of the audio output device by the acoustic attenuation level.

At 1213, the one or more processors of 1208 determine, from the signals from the one or more sensors, a received audio input sound pressure level of the audio input decreasing. At 1213, the one or more processors of 1208 reduce the audio output sound pressure level of the audio output device.

At 1214, the one or more processors of 1208, where the plurality of persons are within the environment of the electronic device, attempt to identify, from signals from the one or more sensors, each person of the plurality of persons. Where fewer than all persons of the plurality of persons are identified, the one or more processors of 1208 initialize the audio output sound pressure level of the audio output device at a third audio output sound pressure level that is less than the second audio output sound pressure level.

At 1215, a method in an electronic device comprises receiving an audio input from one or more sources with an audio input device. At 1215, the method comprises determining whether the audio input was received from a single source or a plurality of sources with one or more sensors.

At 1215, the method comprises initializing an audio output device by one of the following: Where the audio input is received from the single source, by adjusting, with one or more processors, an audio output sound pressure level of the audio output device to a first audio output sound pressure level; where the audio input is received from the plurality of sources, and each source of the plurality of sources is identified, by adjusting, with the one or more processors, the audio output sound pressure level of the audio output device to a second audio output sound pressure level that is less than the first audio output sound pressure level; and where the audio input is received from the plurality of sources, and fewer than all sources of the plurality of sources is identified, by adjusting, with the one or more processors, the audio output sound pressure level of the audio output device to a third audio output sound pressure level that is less than the second audio output sound pressure level.

At 1216, the determining whether the audio input was received from the single source or the plurality of sources of 1215 comprises capturing, with an imager, one or more images of an environment of the electronic device and identifying how many sources are represented in the one or more images.

At 1217, the method of 1215 further comprises identifying, with the one or more sensors, an authorized user of the electronic device from the one or more sources. At 1218, the method of 1217 further comprises determining a distance between the authorized user and the electronic device decreasing and reducing the audio output sound pressure level of the audio output device.

At 1219, the method of 1217 further comprises determining a distance between an ear of the authorized user and the electronic device decreasing and reducing the audio output sound pressure level of the audio output device. At 1220, the method of 1217 further comprises estimating an acoustic attenuation level of the audio input as a function of a distance between the authorized user and the electronic device and increasing the audio output sound pressure level of the audio output device by the acoustic attenuation level.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
  receiving, with an audio input device, an audio input from one or more sources;
  determining, with one or more sensors operable with one or more processors, whether the audio input was received from a single source or a plurality of sources;
  where the audio input is received from the single source, adjusting, with the one or more processors, an audio output sound pressure level of an audio output device to a first audio output sound pressure level;
  where the audio input is received from the plurality of sources, adjusting, with the one or more processors, the audio output sound pressure level of the audio output device to a second audio output sound pressure level that is less than the first audio output sound pressure level; and
  where the audio input is received from the plurality of sources, attempting to identify, with the one or more processors from signals from the one or more sensors, each source of the plurality of sources; and
  where at least one source of the plurality of sources is unidentified, adjusting, with the one or more processors, the audio output sound pressure level of the audio output device to a third audio output sound pressure level that is different from the second audio output sound pressure level.

2. The method of claim 1, further comprising:
  determining, with the one or more processors, a received audio input sound pressure level of the audio input decreasing; and
  reducing, with the one or more processors, the audio output sound pressure level of the audio output device.

3. The method of claim 1, further comprising:
  determining, with the one or more processors, a received audio input sound pressure level of the audio input increasing; and
  increasing, with the one or more processors, the audio output sound pressure level of the audio output device.

4. The method of claim 1, further comprising:
  determining, with the one or more sensors, a distance between the one or more sources and the electronic device decreasing; and
  reducing, with the one or more processors, the audio output sound pressure level of the audio output device.

5. The method of claim 1, further comprising:
  determining a distance between a closest source of the one or more sources and the electronic device;
  estimating, with the one or more processors, an acoustic attenuation level of the audio input as a function of the distance; and
  increasing, with the one or more processors, the audio output sound pressure level of the audio output device by an amount equal to or less than the acoustic attenuation level.

6. The method of claim 1, further comprising:
  identifying, with the one or more sensors, an authorized user of the electronic device from the one or more sources;
  determining, with the one or more sensors, a distance between the authorized user and the electronic device decreasing; and
  reducing, with the one or more processors, the audio output sound pressure level of the audio output device.

7. An electronic device, comprising:
  one or more sensors;
  an audio output device; and
  one or more processors operable with the one or more sensors and the audio output device;
  the one or more processors:
  determining, from signals from the one or more sensors, whether a single person or a plurality of persons are within an environment of the electronic device; and
  where the single person is within the environment of the electronic device, initializing an audio output sound pressure level of the audio output device at a first audio output sound pressure level; and
  where the plurality of persons are within the environment of the electronic device initializing the audio output sound pressure level of the audio output device at a second audio output sound pressure level that is less than the first audio output sound pressure level; and
  where the plurality of persons are within the environment of the electronic device, attempting to identify, from the signals from the one or more sensors, each person of the plurality of persons and, where fewer than all persons of the plurality of persons are identified, initializing the audio output sound pressure level of the audio output device at a third audio output sound pressure level that is less than the second audio output sound pressure level.

8. The electronic device of claim 7, the one or more sensors comprising an imager capturing one or more images of the environment of the electronic device, the one or more processors determining whether the single person or the plurality of persons are within the environment of the electronic device from the one or more images.

9. The electronic device of claim 7, the one or more sensors comprising an audio input device capturing audio input from the environment of the electronic device, the one or more processors determining whether the single person or the plurality of persons are within the environment of the electronic device from the audio input.

10. The electronic device of claim 7, the one or more processors determining, from the signals from the one or more sensors, a distance between the single person or the plurality of persons decreasing and reducing, with the one or more processors, the audio output sound pressure level of the audio output device.

11. The electronic device of claim 10, the one or more processors estimating an acoustic attenuation level of the audio input as a function of the distance and increasing the audio output sound pressure level of the audio output device by the acoustic attenuation level.

12. The electronic device of claim 7, the one or more processors determining, from the signals from the one or more sensors, a received audio input sound pressure level of the audio input decreasing and reducing the audio output sound pressure level of the audio output device.

13. A method in an electronic device, the method comprising:
  receiving an audio input from one or more sources with an audio input device;
  determining whether the audio input was received from a single source or a plurality of sources with one or more sensors; and
  initializing an audio output device by one of:
  where the audio input is received from the single source, adjusting, with one or more processors, an audio output sound pressure level of the audio output device to a first audio output sound pressure level;

where the audio input is received from the plurality of sources, and each source of the plurality of sources is identified, adjusting, with the one or more processors, the audio output sound pressure level of the audio output device to a second audio output sound pressure level that is less than the first audio output sound pressure level; and where the audio input is received from the plurality of sources, and fewer than all sources of the plurality of sources is identified, adjusting, with the one or more processors, the audio output sound pressure level of the audio output device to a third audio output sound pressure level that is less than the second audio output sound pressure level.

14. The method of claim 13, wherein the determining whether the audio input was received from the single source or the plurality of sources comprises capturing, with an imager, one or more images of an environment of the electronic device and identifying how many sources are represented in the one or more images.

15. The method of claim 13, further comprising identifying, with the one or more sensors, an authorized user of the electronic device from the one or more sources.

16. The method of claim 15, further comprising determining a distance between the authorized user and the electronic device decreasing and reducing the audio output sound pressure level of the audio output device.

17. The method of claim 15, further comprising determining a distance between an ear of the authorized user and the electronic device decreasing and reducing the audio output sound pressure level of the audio output device.

18. The method of claim 15, further comprising estimating an acoustic attenuation level of the audio input as a function of a distance between the authorized user and the electronic device and increasing the audio output sound pressure level of the audio output device by the acoustic attenuation level.

* * * * *